(12) United States Patent
Endo et al.

(10) Patent No.: US 6,778,323 B2
(45) Date of Patent: Aug. 17, 2004

(54) CONFOCAL MICROSCOPE

(75) Inventors: Tomio Endo, Hidaka (JP); Yukio Eda, Akiruno (JP); Katsuya Sadamori, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 154 days.

(21) Appl. No.: 10/086,152

(22) Filed: Feb. 27, 2002

(65) Prior Publication Data

US 2002/0097490 A1 Jul. 25, 2002

Related U.S. Application Data

(62) Division of application No. 09/532,818, filed on Mar. 21, 2000, now Pat. No. 6,426,835.

(30) Foreign Application Priority Data

| Mar. 23, 1999 | (JP) | 11-078281 |
| Mar. 24, 1999 | (JP) | 11-080026 |
| Mar. 24, 1999 | (JP) | 11-080028 |
| Mar. 24, 1999 | (JP) | 11-080202 |

(51) Int. Cl.[7] ............ G02B 21/00; G02B 26/02
(52) U.S. Cl. ............ 359/383; 359/234; 359/368
(58) Field of Search ............ 359/368–390, 359/227–235; 250/201.1–201.3

(56) References Cited

U.S. PATENT DOCUMENTS

| 4,165,919 A | | 8/1979 | Little ............ 359/234 |
| 4,483,590 A | | 11/1984 | Moss ............ 359/235 |
| 4,661,692 A | * | 4/1987 | Kawasaki ............ 250/201.2 |
| 4,827,125 A | * | 5/1989 | Goldstein ............ 250/234 |
| 5,067,805 A | | 11/1991 | Corle et al. ............ 359/235 |
| 5,283,684 A | * | 2/1994 | Thomas et al. ............ 359/234 |
| 5,532,874 A | * | 7/1996 | Stein ............ 359/394 |
| 5,638,206 A | * | 6/1997 | Sumiya et al. ............ 359/368 |
| 5,923,466 A | | 7/1999 | Krause et al. ............ 359/368 |
| 5,933,513 A | * | 8/1999 | Yoneyama et al. ............ 382/106 |
| 5,969,846 A | | 10/1999 | Kishi ............ 359/227 |
| 6,191,885 B1 | * | 2/2001 | Kitagawa ............ 359/368 |
| 6,281,657 B1 | * | 8/2001 | Matsuo ............ 318/705 |

FOREIGN PATENT DOCUMENTS

| DE | 40 23 292 A1 | 1/2002 |
| WO | WO 97/31282 | 8/1997 |

OTHER PUBLICATIONS

Nature, vol. 1, 383, No. 6603, Oct. 1966, pp. 804–806, by R. Juskaitis et al, entitled "Efficient Real–Time Confocal Microscopy with White Light Sources".

Journal of Microscopy, vol. 189, pt. 2, pp. 114–117 (1998), by M. A. A. Neil et al, entitled: A Light Efficient Optically Sectioning Microscope.

* cited by examiner

*Primary Examiner*—Thong Q Nguyen
(74) *Attorney, Agent, or Firm*—Frishauf, Holtz, Goodman & Chick, P.C.

(57) ABSTRACT

In a confocal microscope, a beam of light from a light source is lead to a rotary disk by way of an optical lens and a half mirror, and made to strike specimen by way of an objective lens. The rotary disk has random pin hole pattern sections where pin holes are randomly bored through a light blocking mask, and an aperture section having an area $k^2$ times greater than the area of the random pin hole pattern sections and allowing any light to pass therethrough. The beam of light reflected by the specimen is made to enter a CCD camera by way of the objective lens, the rotary disk, the half mirror and a condenser lens. The CCD camera is adapted to selectively pick up a composite image containing a confocal image component and a non-confocal image component of the specimen obtained through the random pin hole pattern sections and a conventional image of the specimen obtained through the aperture section. Then, a CPU carries out an arithmetic operation of subtracting the conventional image data from the composite image data by means of a difference program to produce a confocal image of the specimen.

6 Claims, 14 Drawing Sheets

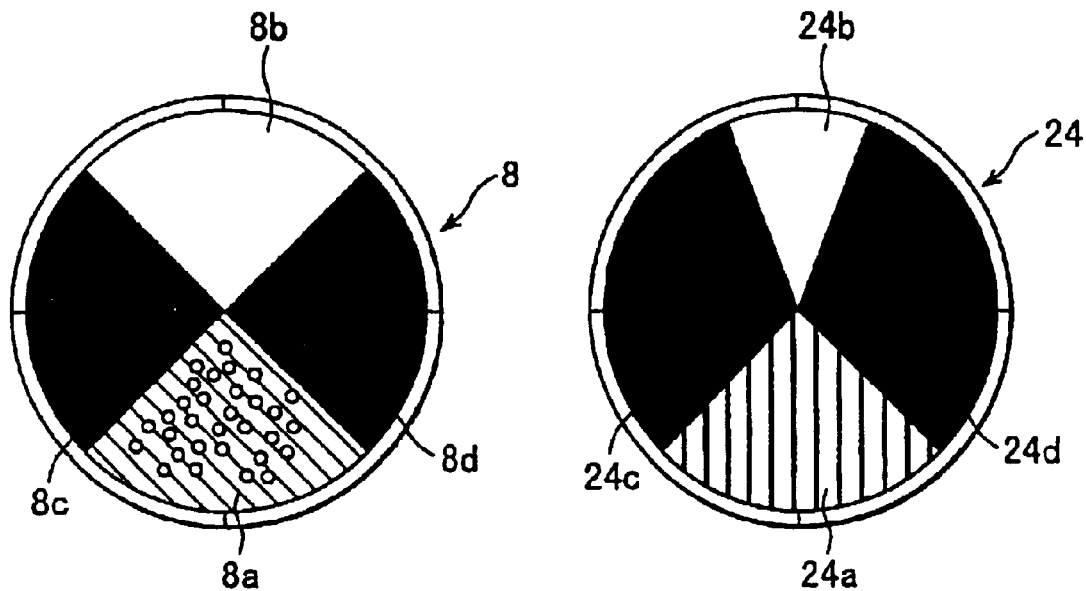
FIG. 2
(PRIOR ART)
FIG. 3
(PRIOR ART)
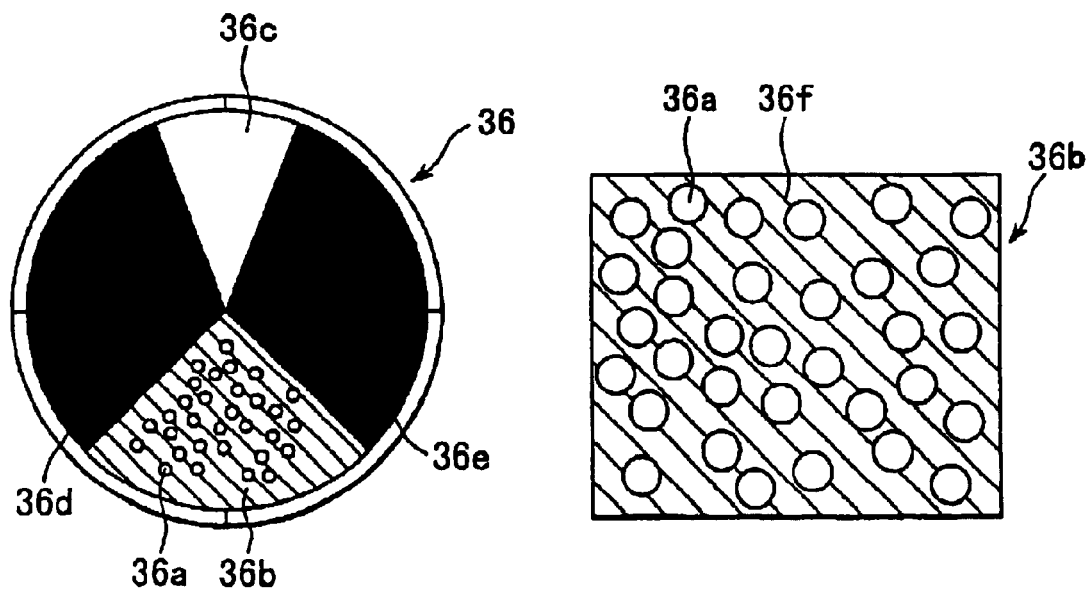
FIG. 5A
FIG. 5B

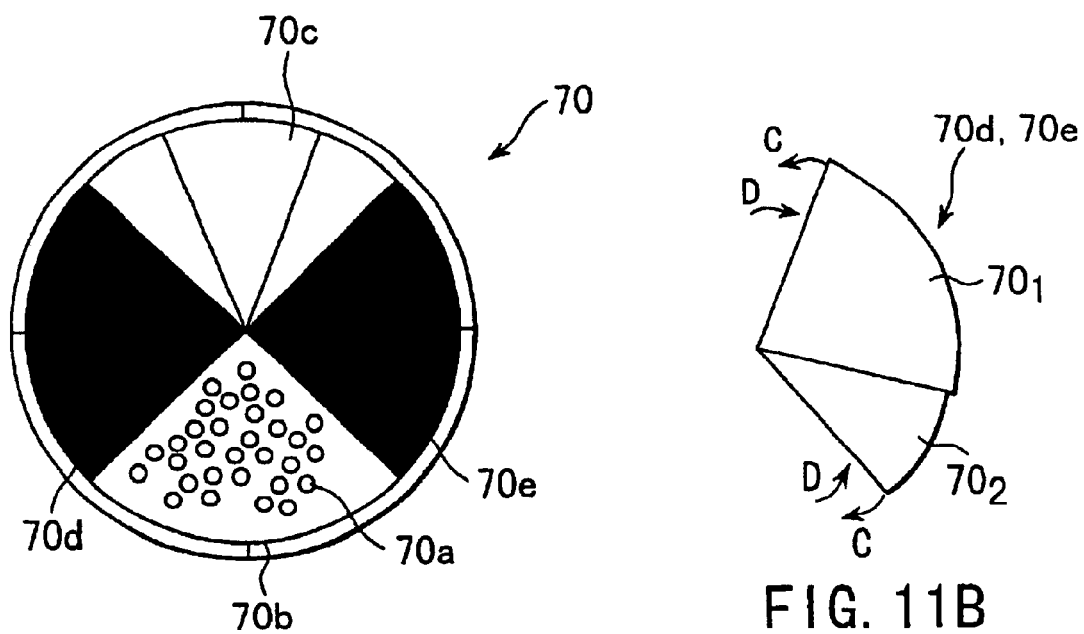
FIG. 11A
FIG. 11B
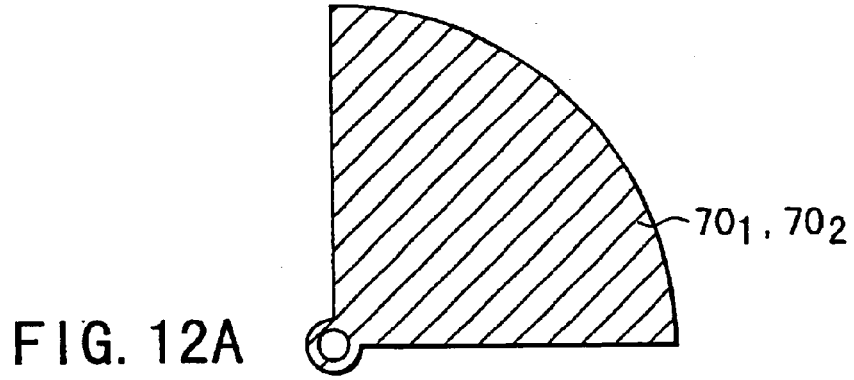
FIG. 12A
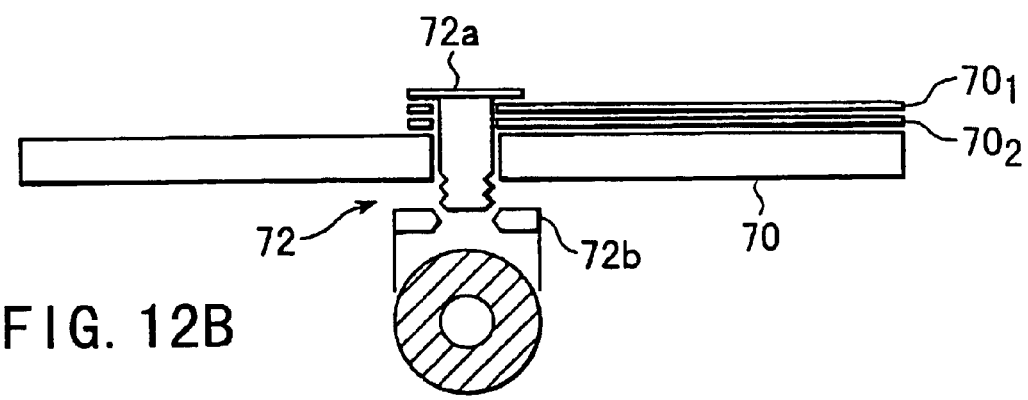
FIG. 12B

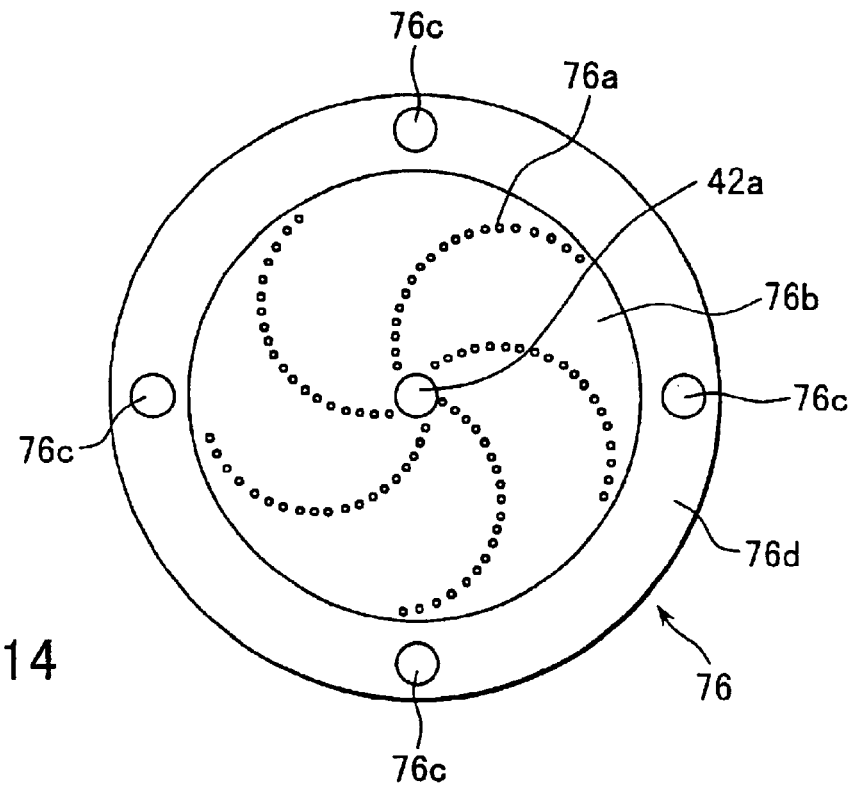
FIG. 14
FIG. 15A REVOLUTION DETECTION SIGNAL Q
FIG. 15B TRIGGER SIGNAL $T_1$ TO CCD CAMERA
FIG. 15C CAMERA OPERATION
FIG. 15D TRIGGER SIGNAL $T_2$ TO Z-STAGE
FIG. 15E Z-STAGE OPERATION

CONFOCAL MICROSCOPE

CROSS-REFERENCE TO RELATED APPLICATIONS

This is a division of application Ser. No. 09/532,818 filed Mar. 21, 2000 now U.S. Pat. No. 6,426,835.

This application is based upon and claims the benefit of priority from the prior Japanese Patent Applications No. 11-078281, filed Mar. 23, 1999; No. 11-080026, filed Mar. 24, 1999; No. 11-080028, filed Mar. 24, 1999; and No. 11-080202, filed Mar. 24, 1999, the entire contents of which are incorporated herein by reference.

BACKGROUND OF THE INVENTION

This invention relates to a confocal microscope adapted to observe and measure the micro-structure and the three-dimensional profile of a specimen by utilizing light.

Known typical confocal microscopes adapted to operate at high speed include those comprising a Nipkow's disk having a large number of pin holes arranged helically at intervals about ten times as large as their diameter. A confocal microscope comprising a Nipkow's disk is required to eliminate cross talk arising from adjacently located pin holes, and hence relatively large intervals have to be used in order to separate the pin holes from each other. The large intervals reduce the efficiency of utilizing the beam of light from the light source and, as a matter of fact, only 1% of the beam coming from the light source is utilized for the operation of the microscope. This means that the obtained image of the specimen is very dark.

R. Juskaitis, T. Wilson et al. proposed an improvement to confocal microscopes comprising a disk in "Efficient real-time confocal microscopy with white light sources", Nature, Vol. 1, 383, Oct., 1996, pp. 804–806 and International Disclosure No. WO97/31282. FIG. 1 of the accompanying drawings schematically illustrates a confocal microscope as proposed by T. Wilson et al.

Referring to FIG. 1, an optical lens 4 and a half mirror 6 are arranged on the optical path of the beam of light emitted from light source 2, which may be a halogen light source or a mercury light source. A rotary disk 8, an objective lens 10 and a specimen 12 are arranged on the optical path of the light beam reflected by the half mirror 6.

Now, referring to FIG. 2, the rotary disk 8 has a random pin hole pattern section 8a where pin holes are randomly arranged and an aperture section 8b where light can pass freely. The random pin hole pattern section 8a and aperture section 8b are separated from each other by a pair of light blocking sections 8c, 8d that block any light trying to pass therethrough. The rotary disk 8 is linked to the shaft of a motor (not shown) by way of rotary shaft 14 so that it can be driven to rotate at a predetermined constant rate.

The beam of light reflected by the specimen 12 is made to enter CCD camera 18 by way of the objective lens 10, the rotary disk 8, the half mirror 6 and condenser lens 16. The CCD camera 18 is controlled for the timing of its image pickup operation in synchronism with the rotary motion of the rotary disk 8 in such a way that it picks up two images of the specimen getting to it by way of the random pin hole pattern section 8a and the aperture section 8b respectively.

The images output from the CCD camera 18 are stored in computer 20. Of these, the image caught by the camera by way of the random pin hole pattern section 8a is a confocal image to which a non-confocal image (hereinafter referred to as composite image) is overlaid due to the fact that the density of pin holes is about ten times as high as that of pin holes of an ordinary Nipkow's disk.

Only a confocal image is obtained from subtraction of a composite image containing a confocal component and a conventional image obtained through the aperture section 8b. The calculated confocal image is displayed on the monitor 22.

While only 0.5 to 1% of the beam coming from the light source is utilized in a Nipkow's disk type confocal microscope, 25 to 50% of the beam coming from the light source is utilized in a confocal microscope proposed by T. Wilson et al. so that they report that an image much clearer and brighter than an image obtained by a conventional Nipkow's disk type confocal microscope can be obtained by their camera.

Meanwhile, N. A. A. Neil, T. Wilson and R. Juskaitis, "A Light Efficient Optically Sectioning Microscope", Journal of Microscopy, Vol. 189, pt. 2, (1998), pp. 114–117, describes an arrangement as shown in FIG. 3 that is obtained by replacing the disk having randomly arranged pin holes of a known confocal microscope with a disk 24 having a linear pattern section 24a where a large number of light blocking areas and light transmitting areas (slits) are arranged linearly and alternately and an aperture section 24b where light can pass freely, the linear pattern section 24a and the aperture section 24b being separated by a pair of light blocking sections 24c, 24d adapted to block any light trying to pass therethrough. The authors claim that the proposed arrangement using such a disk can also provide a confocal image.

However, the above listed known disk scanning type confocal microscopes are accompanied by the following drawbacks.

While the disk scanning type confocal microscope proposed by T. Wilson et al. (International Disclosure No. WO 97/31282) provides an image tens of several times clearer and brighter than an image that can be obtained by a known Nipkow's disk type confocal microscope, the former is required to subtract the conventional image obtained by way of the light transmitting areas from the image (composite image) obtained by overlaying a non-confocal image to a confocal image getting to it by way of the pin hole section hole section.

However, the ratio of the brightness of the confocal image component to that of the non-confocal image component of a composite image varies as a function of the density of pin holes and the numerical aperture (NA) of the objective lens. On the other hand, the relationship between the brightness of the non-confocal image component of a composite image obtained by the random pin hole pattern section and that of the conventional image obtained at the aperture is not known. Therefore, it is difficult to obtain an optimal confocal image.

Additionally, a disk having linear slits as light transmitting areas does not provide any confocal image components in the direction parallel to the slits of the pattern but it does in the direction perpendicular to the slits of the pattern. In other words, the confocal effect of such a confocal microscope can vary depending on the direction of the image relative to the linear slits.

Still additionally, there may be cases where it is desirable to allow the non-confocal image to remain to a slight extent in addition to the obtained confocal image in order to vertically observe the specimen. However, with any known confocal microscopes adapted to obtain the confocal image by way of a subtracting process, the effect of the latter is automatically defined by the ratio of the area of the pin hole section and that of the light transmitting section (aperture section) so that the desk has to be replaced in order to change the effect of subtracting the conventional image from the composite image.

BRIEF SUMMARY OF THE INVENTION

In view of the above described problems of known confocal microscopes, it is therefore the first object of the present invention to provide a confocal microscope that can make the brightness of the non-confocal image component of the composite image and that of the conventional image substantially equal to each other in order to obtain an optimal confocal image.

The second object of the present invention is to provide a confocal microscope comprising a rotary disk having a light transmitting section (aperture section) formed by alternately arranging linear light blocking areas and light transmitting areas (slits), the rotary disk being adapted to obtain a relatively uniform confocal image.

The third object of the present invention is to provide a confocal microscope comprising a rotary disk and adapted to vary the ratio of the confocal image component to the non-confocal image component.

According to the invention, the above first object is achieved by providing a confocal microscope comprising:
 a lighting means for illuminating a specimen with a beam of light;
 an extraction means having sites for transmitting the beam of light emitted from the lighting means and sites for blocking light and adapted to extract a composite image obtained by overlaying a non-confocal image on a confocal image and a conventional image from the beam of light coming from the specimen;
 an image pickup means for selectively picking up the composite image and the conventional image extracted by the extraction means; and
 a control means for obtaining a confocal image of the specimen from the composite image and the conventional image picked up by the image pickup means, wherein
  the extraction means has semi-transmissive regions showing a light transmissivty of k and an aperture region freely transmitting light irradiated from the lighting means, the semi-transmissive regions and the aperture region being adapted to selective use, and the area of the aperture region is equal to that of any of the semi-transmissive regions multiplied by $k^2$.

According to the invention, the above second object is achieved by providing a confocal microscope comprising:
 a lighting means for illuminating a specimen with a beam of light;
 an extraction means having sites for transmitting the beam of light emitted from the lighting means and sites for blocking light and adapted to extract a composite image obtained by overlaying a non-confocal image on a confocal image and a conventional image from the beam of light coming from the specimen;
 an image pickup means for selectively picking up the composite image and the conventional image extracted by the extraction means; and
 a control means for obtaining a confocal image of the specimen from the composite image and the conventional image picked up by the image pickup means, wherein
  the extraction means is formed by a disk rotatable around a rotary shaft located at the center thereof and the semi-transmissive regions contain a plurality of linear slits allowing light to pass therethrough, the semi-transmissive regions of the disk having a contour of a sector with a central angle not smaller than 90°, the top of the sector being located at the rotary shaft.

According to the invention, the above third object is achieved by providing a confocal microscope comprising:
 a lighting means for illuminating a specimen with a beam of light;
 an extraction means having sites for transmitting the beam of light emitted from the lighting means and sites for blocking light and adapted to extract a composite image obtained by overlaying a non-confocal image on a confocal image and a conventional image from the beam of light coming from the specimen;
 an image pickup means for selectively picking up the composite image and the conventional image extracted by the extraction means; and
 a control means for obtaining a confocal image of the specimen from the composite image and the conventional image picked up by the image pickup means, wherein
  the arithmetic operation means carries out a subtraction on the composite image data and the conventional image data obtained by the image pickup means by using a coefficient for realizing a desired ratio.

According to the invention, the above fourth object is achieved by providing a confocal microscope comprising adapted to focus a beam of light by way of a mask pattern member variably operating with a predetermined pattern and an objective lens and cause the beam of light reflected by the specimen to enter an image pickup means by way of the objective lens and the mask pattern member to produce an image of the specimen for observation, the microscope comprising:
 a drive means for driving the image pickup means for an image pickup operation in synchronism with the variable operation of the mask pattern member and modifying the relative distance between the objective lens and the specimen along the optical axis of the objective lens.

According to the invention, the above fifth object is achieved by providing a confocal microscope comprising:
 a lighting means for illuminating a specimen with a beam of light;
 a plurality of objective lenses with different respective magnifications for focusing the beam of light coming from the lighting means and the specimen;
 a rotary member having a plurality of pattern sections arranged respectively corresponding to the plurality of objective lenses for obtaining confocal image data of an image including those of the non-confocal component thereof and an aperture section for obtaining non-confocal image data containing only those of the non-confocal component;
 a rotary drive means for driving the rotary member to rotate in a predetermined sense;
 an image pickup means for picking up an image by means of the beam of light passing through each of the pattern sections and the aperture section of the rotary member driven to rotate by the rotary drive means;
 an image processing means for storing the data of each image obtained by the image pickup means and obtaining a confocal image;

a synchronizing signal generating means for generating a synchronizing signal in synchronism with the operation the image pickup means;

a detection means for detecting the state of rotation of the rotary member;

a control means for synchronizing the phase of the detection signal from the detection means and the signal from the synchronizing signal generating means; and a trigger signal generating means for generating a signal to be used for controlling the image pickup means on the basis of the timing of the signal from the synchronizing signal generating means and the detection signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a schematic plan view of a rotary disk having a random pin hole pattern that can be used for the confocal microscope of FIG. 1.

FIG. 3 is a schematic plan view of the rotary disk having a linear pattern section that can be used for the confocal microscope of FIG. 1.

FIG. 5A is a schematic plan view of a rotary disk that can be used for the confocal microscope of FIG. 4.

FIG. 5B is an enlarged schematic partial plan view of the rotary disk of FIG. 5A, illustrating the pattern in greater detail.

FIG. 11A is a schematic plan view of a rotary disk that can be used for the fourth embodiment of confocal microscope according to the invention.

FIG. 11B is a schematic plan view of the light blocking section of the rotary disk of FIG. 11A.

FIG. 12A is a schematic partial plan view of a rotary disk that can be used for the fourth embodiment of confocal microscope according to the invention.

FIG. 12B is a schematic cross sectional lateral view of the rotary disk of FIG. 12A.

FIG. 14 is schematic plan view of a rotary disk that can be used for the confocal microscope of FIG. 13.

FIGS. 15A to 15E illustrate timing charts for the exposure operation of the CCD camera and those for starting and stopping the operation of the Z stage of the confocal microscope of FIG. 13.

DETAILED DESCRIPTION OF THE INVENTION

Now, the present invention will be described in greater detail by referring to the accompanying drawing that illustrates preferred embodiments of the invention.

Figure 1:
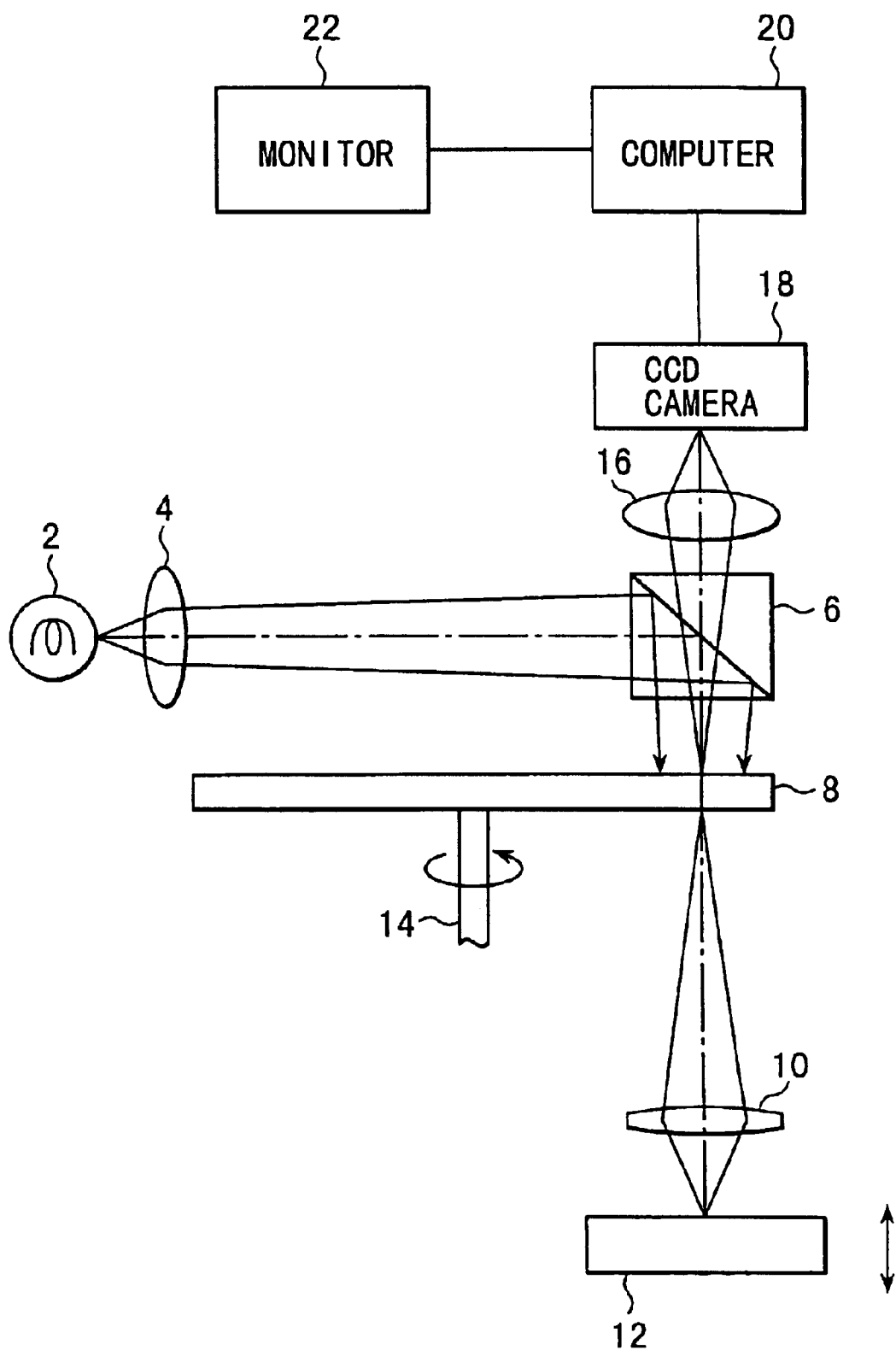
FIG. 1 is a schematic block diagram of a known confocal microscope.
Figure 4:
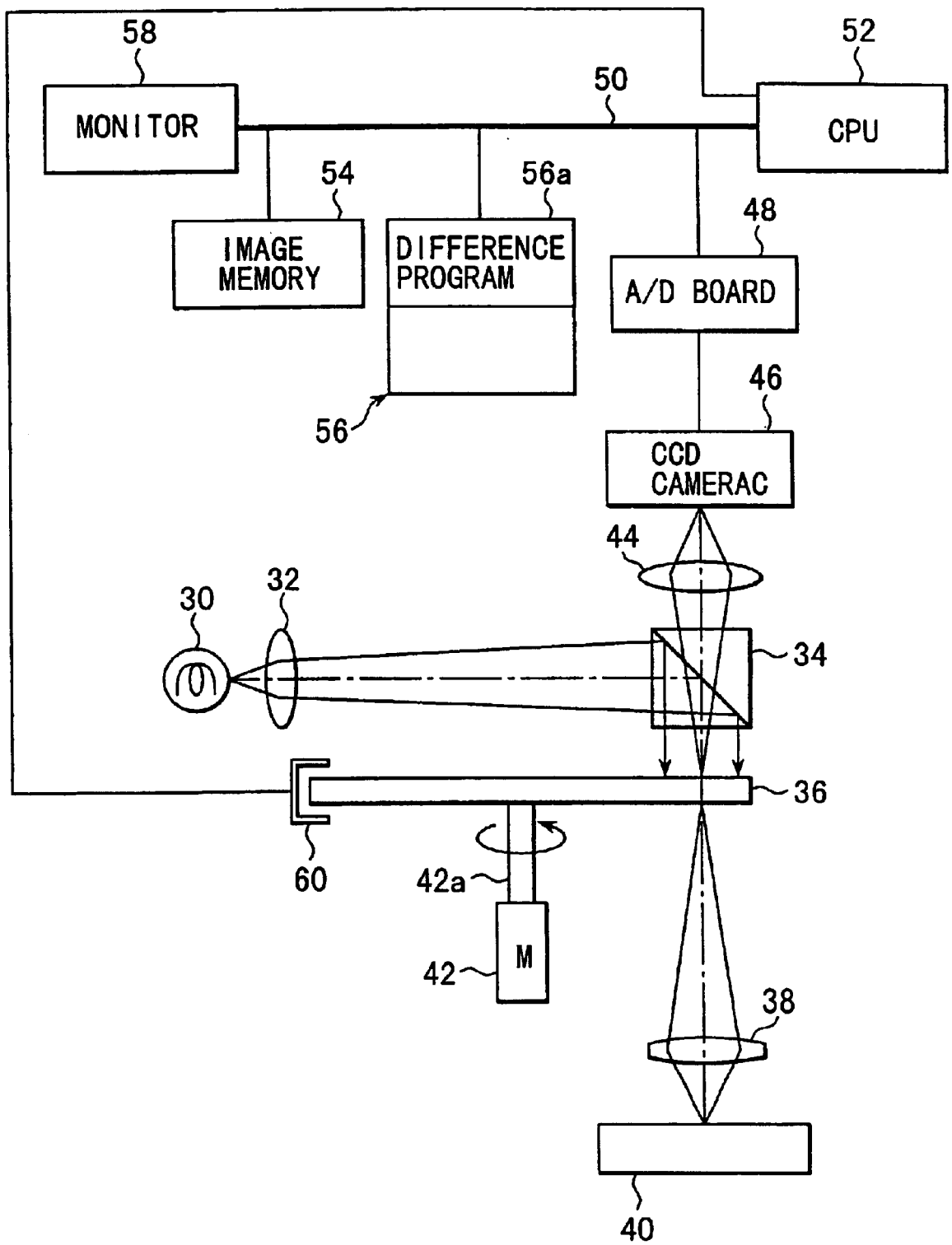
FIG. 4 is a schematic block diagram of the first embodiment of confocal microscope according to the invention, illustrating its configuration.

FIG. 4 is a schematic block diagram of the first embodiment of confocal microscope according to the invention and FIG. 5A is a schematic plan view of a rotary disk that can be used the first embodiment confocal microscope as illustrated in FIG. 4.

Referring to FIG. 4, an optical lens 32 and a half mirror 34 are arranged on the optical path of the beam of light emitted from light source 30 which may be a halogen light source or a mercury light source. Then, a rotary disk 36, an objective lens 38 and a specimen to be observed 40 are arranged on the optical path of the beam of light reflected by the half mirror 34.

Referring now to FIG. 5A, the rotary disk 36 has a random pin hole pattern section 36b where a plurality of pin holes 36a are arranged randomly to take about 25 to 50% of the total area of the section 36b and an aperture section 36c where light can freely pass. The random pin hole pattern section 36b and the aperture section 36c are separated by a pair of light blocking sections 36d, 36e.

The rotary disk 36 is linked to motor 42 by way of rotary shaft 42a so that it can be driven to rotate at a predetermined rate.

A CCD camera 46 is arranged on the optical path of the half mirror 34, on which light reflected from a specimen 40 passes. The CCD camera 46 comprises a condenser lens 44 and an image pickup device where a plurality of pixels are arranged.

The image output terminal of the CCD camera 46 is connected to an A/D board 48, which A/D board 48 is by turn connected to CPU 52, image memory 54 for storing images, memory 56 for storing a difference program 56a adapted to subtract images and monitor 58 operating as output means for outputting the outcome of the image processing operation of the difference program. The CPU 52 is connected to photo-interrupter 60 arranged near the edge of the rotary disk 36 and operating as revolution detection means for detecting the revolutions of the rotary disk 36.

Now, the operation of the embodiment having the above described configuration will be discussed below.

The beam of light emitted from the light source 30 is reflected by the half mirror 34 after passing through the optical path lens 32 and then strikes the rotary disk 36 rotating at a predetermined rate. The beam of light striking the rotary disk 36 is made to pass through the pin holes 36a of the random pin hole pattern section 36b and the aperture section 36c of the rotary disk 36 and then focused by the objective lens 38 to strike the specimen 40.

The beam of light reflected by the specimen 40 is once again made to pass through the objective lens 38 and then the pin holes 36a of the random pin hole pattern section 36b and the aperture section 36c of the rotary disk 36 before entering the half mirror 34. The beam of light entering the half mirror 34 is then made to pass through the latter and enter the CCD camera 46 by way of the condenser lens 44 to produce an optical image of the specimen 40 there. More specifically, the CCD camera 46 is controlled for the timing of its image pickup operation in synchronism with the rotary speed of the rotary disk 36 so that two images are picked up by it for the specimen 40, one formed by the beam of light coming through the random pin hole pattern section 36b and the other formed by the beam of light coming through the aperture section 36c of the rotary disk 36.

The output images of the CCD camera 46 are transformed into digital data by the A/D board 48, which digital data are then stored in the image memory 54 by way of the bus 50. The image formed by the beam of light passing through the random pin hole section 36b is a composite image comprising a confocal image and a non-confocal image. The image, on the other hand, formed by the beam of light passing through the aperture section 36c is a conventional image which is a non-confocal image.

FIG. 5B is an enlarged schematic partial plan view of the rotary disk of FIG. 5A, illustrating the random pin hole pattern section 36b of the disk in greater detail. As shown in FIG. 5B, the section 36b has a plurality of pin holes 36a that allow light to pass therethrough and a shield mask 36f, which occupies the area other than the pin holes 36a and is formed typically by depositing Cr by evaporation so as not to allow any light to pass therethrough. The half-diameter r of the pin holes 36a is normally so selected as to be expressed by formula (1) below:

$$r = bM\lambda/NA \qquad (1),$$

where M represents the magnification of the sample image projected on the disk, NA is the aperture ratio, $\lambda$ is the wavelength of light and b is a constant which is about 0.35. Therefore, if the wavelength $\lambda$ is equal to 550 nm, the magnification M is 100 and NA=0.9, the half-diameter r of the pin holes will be 21.4 µm.

If the area of the random pin hole pattern section 36b having a profile of a sector is $S_0$ and the total area of the plurality of light-transmitting pin holes is $S_1$, the transmissivity k of the sector-shaped random pin hole section 36b is expressed by formula (2) below.

$$k = S_1/S_0 \qquad (2)$$

Assume that the brightness data of point (x,y) of a conventional image of an ordinary microscope is $m_{(x,y)}$. Since such an image contains brightness data $m_{fo(x,y)}$ of a focused conventional image and brightness data $m_{defo(x,y)}$ of a defocused conventional image, the brightness data of the conventional image is expressed by formula (3) below.

$$m_{(x,y)} = m_{fo(x,y)} + m_{defo(x,y)} \qquad (3)$$

The image obtained by means of a rotary disk where pin holes are arranged much more densely than a conventional Nipkow's disk is a composite image containing not only a focused image but also an defocused image. Assume that the brightness data of point (x,y) of a composite image containing a defocused image is $cm_{co(x,y)}$. Then, the brightness data $cm_{co(x,y)}$ of the composite image is the sum of the data of the focused confocal component $c_{co(x,y)}$ and the data of the defocused confocal component $cm_{defo(x,y)}$ or $$cm_{co(x,y)} = c_{fo(x,y)} + cm_{defo(x,y)} \qquad (4).$$

Note that the focused confocal component $c_{fo(x,y)}$ is the one formed by the beam of light that passes through a pin hole, is reflected by the specimen and then passes through the pin hole in the opposite direction.

Mean while, the defocused conventional image $m_{defo(x,y)}$ of a point is formed by the beam of light reflected by the specimen in areas other than the corresponding point. Therefore, it is identical with the defocused component $m_{defo(x,y)}$ except the brightness. If the transmissivity of light of the pin holes is k, the brightness data $cm_{defo(x,y)}$ of the defocused component of the pin holes represents a brightness that is k times of the brightness represented by the brightness data $m_{defo(x,y)}$ of the defocused image of the legible part so that the relationship of formula (5) below holds true.

$$cm_{defo(x,y)} \propto k \cdot m_{defo(x,y)} \qquad (5)$$

Since the brightness of the composite image obtained by the pin holes is k times of that of the image obtained from a light-transmitting area as large as the total area of the pin holes, the brightness data $cm_{(x,y)}$ of the obtained composite image is obtained from formulas (4) and (5) above and expressed by formula (6) below.

$$cm_{(x,y)} = k \; cm_{co(x,y)} = k \; c_{fo(x,y)} + k^2 \; m_{defo(x,y)} \qquad (6)$$

By comparing formula (3) and formula (6), it will be seen that a focused image can be obtained by eliminating the brightness data $m_{defo(x,y)}$ of the defocused image component. Thus, formula (7) below is obtained by multiplying formula (3) above by $k^2$ and subtracting the product from formula (6).

$$cm_{(x,y)} - k^2 m_{(x,y)} = k \; c_{fo(x,y)} - k^2 m_{fo(x,y)} \qquad (7)$$

A confocal image can be obtained by carrying out the arithmetic operation of formula (7) above for all the pixels.

To be accurate, the image obtained by formula (7) is different from the data of the confocal image. However, the obtained image contains only focused image components and is free from any defocused image components so that it is a sectioning image in term of the Z-direction like a confocal image. Additionally, it will be seen from the above discussion that the area of the conventional image should be made equal to $k^2$ times of the area of the pin holes.

Thus, if, for instance, the transmissivity of the sector-shaped random pin hole pattern section 36b is ½ and the central angle of the sector is 120°, the central angle of the sector of the aperture section 36c is made equal to 30°. The CPU 52 carries out the above arithmetic operations on the basis of the composite image and the conventional image stored in the image memory 54 by the difference program 56a and the outcome of the operations is displayed on the display screen of the monitor 58. Since the brightness of the conventional image is same as that of the non-confocal image component of the composite image, it will be seen that the confocal image can be obtained by using a simple subtraction.

Thus, as described above, an optimal confocal image can be obtained by employing an aperture section having an area $k^2$ times as large as that of the pin hole pattern section.

Now, the second embodiment of the invention will be described below.

Figure 6:
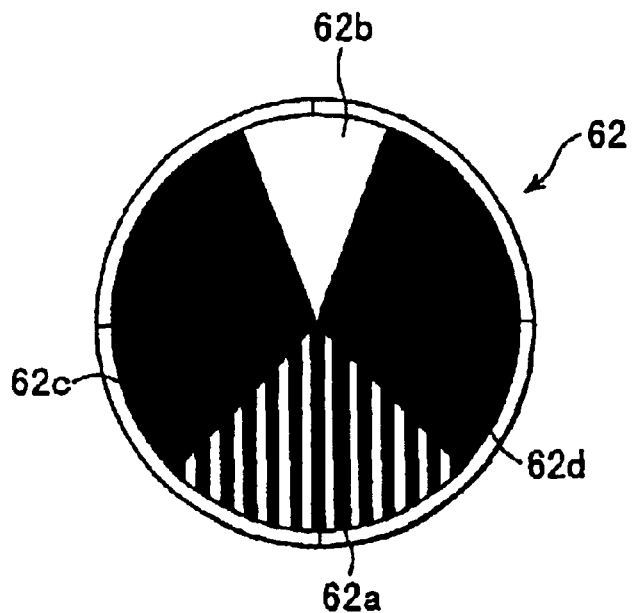
FIG. 6 is a schematic plan view of a rotary disk that can be used for the second embodiment of confocal microscope according to the invention.

FIG. 6 is a schematic plan view of a rotary disk that can be used for the second embodiment of confocal microscope according to the invention. In FIG. 6, the components same as or similar to those of FIG. 4 are denoted respectively by the same reference symbols and will not be described any further. Since the second embodiment is identical with the first embodiment except the configuration of the rotary disk, it will be described here only in terms of the rotary disk.

Referring to FIG. 6, the rotary disk 62 that can be used for the second embodiment comprises a linear pattern section 62a where light blocking areas and light transmitting areas (slits) are arranged linearly and alternately and an aperture section 62b where light can pass freely, the linear pattern section 62a and the aperture section 62b being separated by a pair of light blocking sections 62c, 62d adapted to block any light trying to pass therethrough.

The width of each of the light transmitting areas of the linear pattern section 62a is substantially equal to the diameter of each of the pin holes of the first embodiment and defined by formula (1) above. While width of each of the light shielding areas may be one to three times greater than that of each of the light transmitting areas, it is made equal to the width of each of the light transmitting areas in this embodiment. The sector-shaped linear pattern section 62a and the aperture section 62b have respective central angles of 90° and 22.5°.

The central angle of the sector-shaped linear pattern section 62a is made equal to 90° for the following reasons.

Assume that the CCD camera 46 is picking up an image of the linear pattern section 62a. When the shutter of the CCD camera 46 is open, the image picked up by the CCD camera 46 may change from the one shown in FIG. 7A to the one shown in FIG. 7B because the rotary disk 62 is revolving.

Figures 7A, 7B:
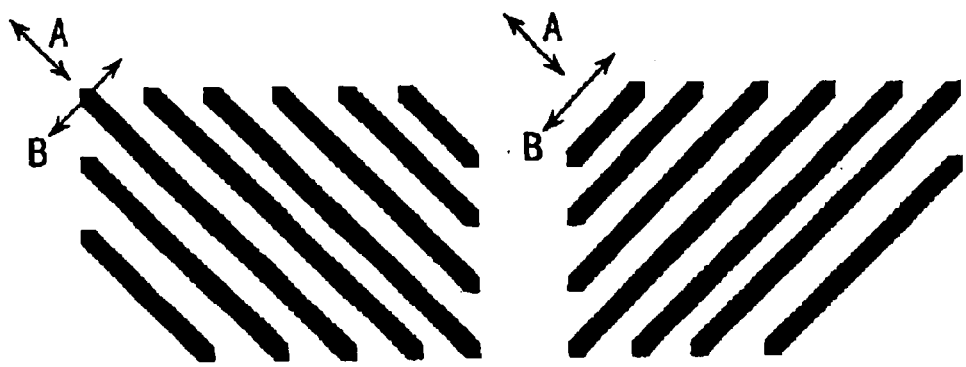
FIG. 7A and FIG. 7B are schematic views of two different images of the linear pattern section that can be picked up by the CCD camera.

In the image shown in FIG. 7A, the linear light transmitting areas are arranged in the direction parallel to arrow A. The image obtained in a direction indicated by arrow A contains only the legible component in the A direction and hence the confocal component is equal to "0". On the other hand, arrow B in FIG. 7A is perpendicular to the linear light transmitting areas. Therefore, the confocal component is maximal and the legible component is minimal in the obtained image.

Meanwhile, in the image shown in FIG. 7B, the linear light transmitting areas are arranged in the direction parallel to arrow B. Under this condition the obtained image contains only the legible component in the B direction and hence the confocal component is equal to "0". On the other hand, arrow A in FIG. 7B is perpendicular to the linear light transmitting areas. Therefore, the confocal component is maximal an the legible component is minimal in the obtained image.

Thus, when a rotary disk having linear light transmitting areas (slits) is used, the ratio of the confocal component to the legible component varies as a function of the direction of the light blocking areas relative to the picked up image.

Therefore, as the longitudinal direction of the light blocking areas is turned by 90°, the confocal component and the non-confocal component are equalized in different directions and hence the image obtained by means of a sector-shaped linear pattern section 62a having a central angle of 90° is a composite image obtained by adding a non-confocal image to a confocal image as in the case of the first embodiment. Thus, the confocal image can be obtained by subtracting, using the CPU 52, the conventional image, which is the non-confocal image, obtained by means of the aperture section 62b from the composite image.

Additionally, since the transmissivity of the linear pattern section 62a is ½ and the area of the aperture section 62b is ¼ of that of the linear pattern section 62a, the confocal image can be obtained by using a simple subtraction without involving a multiplication using a constant.

As described above, a rotary disk having linear light transmitting areas (slits) and linear light blocking areas arranged alternately is used to obtain a composite image in this embodiment. A rotary disk having such a disk pattern can be prepared in a simple manner. Additionally, since the sector-shaped linear pattern section has a central angle of 90°, the confocal component does not vary as a function of the direction of the rotary disk.

Now, the third embodiment of the invention will-be described below.

Figure 9:
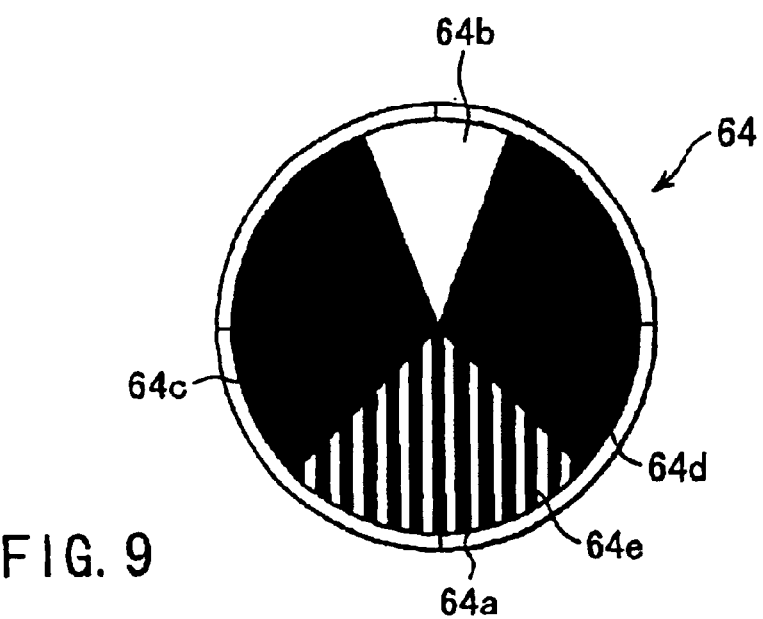
FIG. 9 is a schematic plan view of a rotary disk that can be used for the confocal microscope of FIG. 8.
Figure 8:
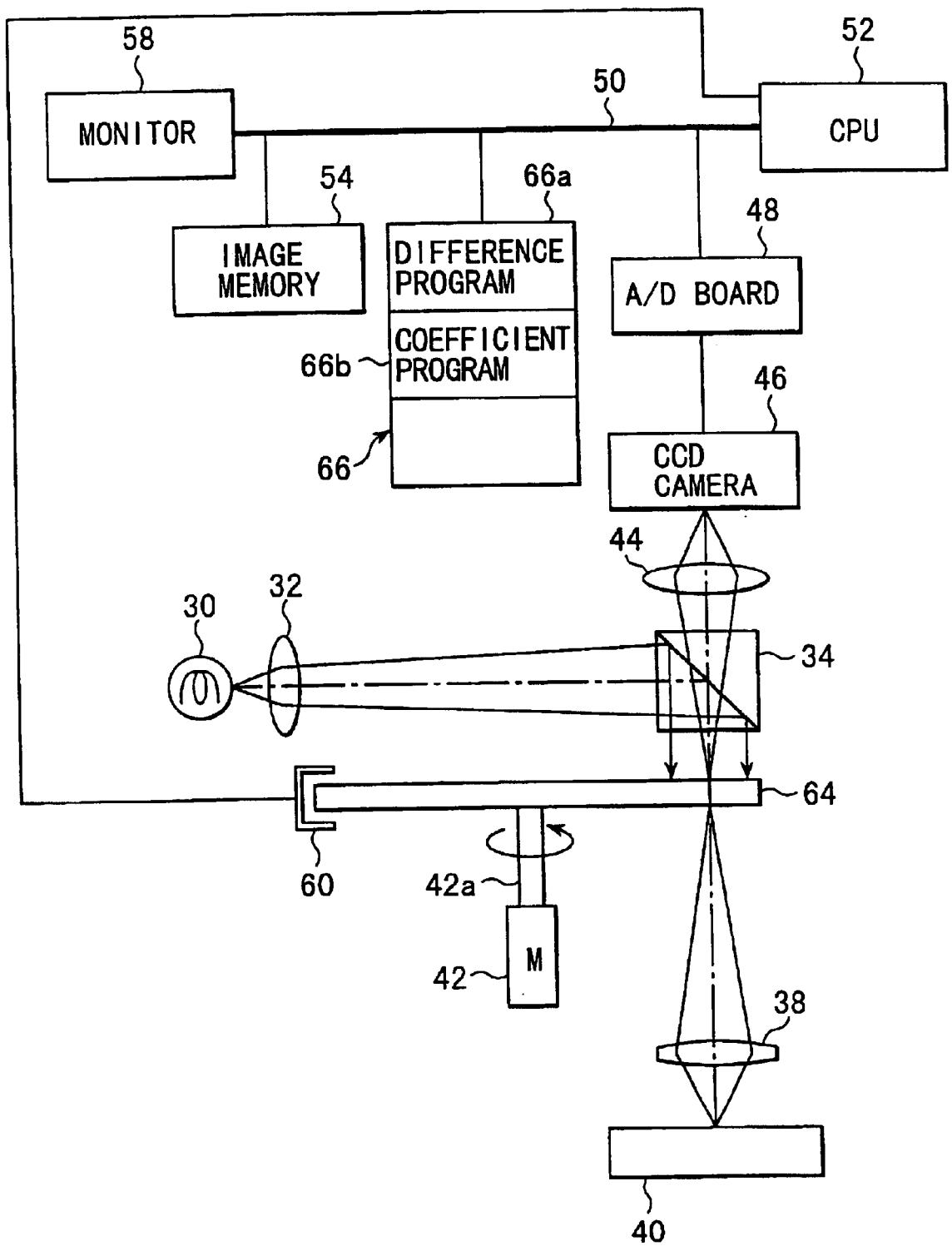
FIG. 8 is a schematic block diagram of the third embodiment of confocal microscope according to the invention.

FIG. 8 is a schematic block diagram of the third embodiment of confocal microscope according to the invention and FIG. 9 is a schematic plan view of a rotary disk that can be used for the confocal microscope of FIG. 8.

As shown in FIG. 8, the rotary disk 64 is arranged on the optical path of the beam of light reflected by half mirror 34 between the half mirror 34 and the objective lens 38.

Referring to FIG. 9, the rotary disk 64 comprises a linear pattern section 64a where a plurality of light blocking areas 64e are arranged linearly in parallel with each other at regular intervals and an aperture section 64b where light can pass freely, the linear pattern section 60a and the aperture section 60b being separated by a pair of light blocking sections 64c, 64d adapted to block any light trying to pass therethrough.

The light blocking areas 64e and the light blocking sections 64c, 64d are made of a shield film typically formed by evaporation. Each of the light blocking areas 64e of the linear pattern section 64a is preferably 1 to 3 times greater than that of the gaps arranged at the lateral sides thereof.

Referring to FIG. 8, A/D board 48 connected to the image output terminal of CCD camera 46 is also connected to CPU 52, image memory 54, monitor 58 and memory 66 storing a subtraction program 66a for subtracting an image component from an image and a coefficient program 66b for modifying the contrast of the obtained digital image.

Now, the operation of the third embodiment having the above described configuration will be discussed below.

The beam of light emitted from the light source 30 is reflected by the half mirror 34 after passing through the optical path lens 32 and then strikes the rotary disk 64 rotating at a predetermined rate. The beam of light striking the rotary disk 64 is made to pass through the linear pattern section 64a and the aperture section 64b of the rotary disk 64 and then focused by the objective lens 38 to strike the specimen 40.

The beam of light reflected by the specimen 40 is once again made to pass through the objective lens 38 and then the linear pattern section 64*a* and the aperture section 64*b* of the rotary disk 64 before entering the half mirror 34 by way of condenser lens 44. The beam of light entering the half mirror 34 is then made to pass through the latter and enter the CCD camera 46 by way of the condenser lens 44 to produce an optical image of the specimen 40 there. More specifically, the CCD camera 46 is controlled for the timing of its image pickup operation in synchronism with the rotary speed of the rotary disk 64 so that two images are picked up by it for the specimen 40, one formed by the beam of light coming through the linear pattern section 64*a* and the other formed by the beam of light coming through the aperture section 64*b* of the rotary disk 64.

The output images of the CCD camera 46 are transformed into digital data by the A/D board 48, which digital data are then stored in the image memory 54 by way of the bus 50. The image formed by the beam of light passing through the linear pattern section 64*a* is a composite image comprising a confocal image and a non-confocal image. The image, on the other hand, formed by the beam of light passing through the aperture section 64*b* is a conventional image which is a non-confocal image.

If the image data of the composite image corresponding to pixel position (x,y) of the image pickup device of the CCD camera 46 is $cm_{(x,y)}$ and the image data corresponding to the conventional image is $m_{(x,y)}$, the image data $c_{(x,y)}$ of the confocal image for the position (x,y) can be obtained by formula (8) below.

$$c_{(x,y)} = cm_{(x,y)} - m_{(x,y)} \tag{8}$$

A confocal image can be obtained by carrying out the arithmetic operation of formula (8) above for all the pixels.

Meanwhile, the ratio of the brightness of the composite image to that of the conventional image is determined by the ratio of the area of the linear pattern section 64*a* and that of the aperture section 64*b*. The non-confocal component of a composite image can be eliminated only by equalizing the brightness of the conventional image and that of the non-confocal component of the composite image. If they show different levels of brightness, the non-confocal image component can be left in the outcome of the subtraction or the confocal image can be subtracted and missed.

In view of the above circumstances, the conventional image data is multiplied by a constant by means of the constant program 66*b* and then the composite image data is subjected to an operation of subtracting therefrom the data of the corresponding position of the conventional image obtained by the above multiplication using a constant by the subtraction program 66*a* in order to computationally obtain the confocal image in order to make the brightness of the non-confocal image component of the composite image equal to that of the conventional image in the third embodiment.

The outcome of the subtraction is displayed on the display screen of the monitor 58. Thus, the user can regulate and modify the obtained image by modifying the constant stored in the constant program 66*b* by visually confirming the outcome of the subtraction on the monitor 58 and also the confocal effect (the state where the defocused component of the image is eliminated from the displayed image) generally by shifting the focal point.

Figure 10:
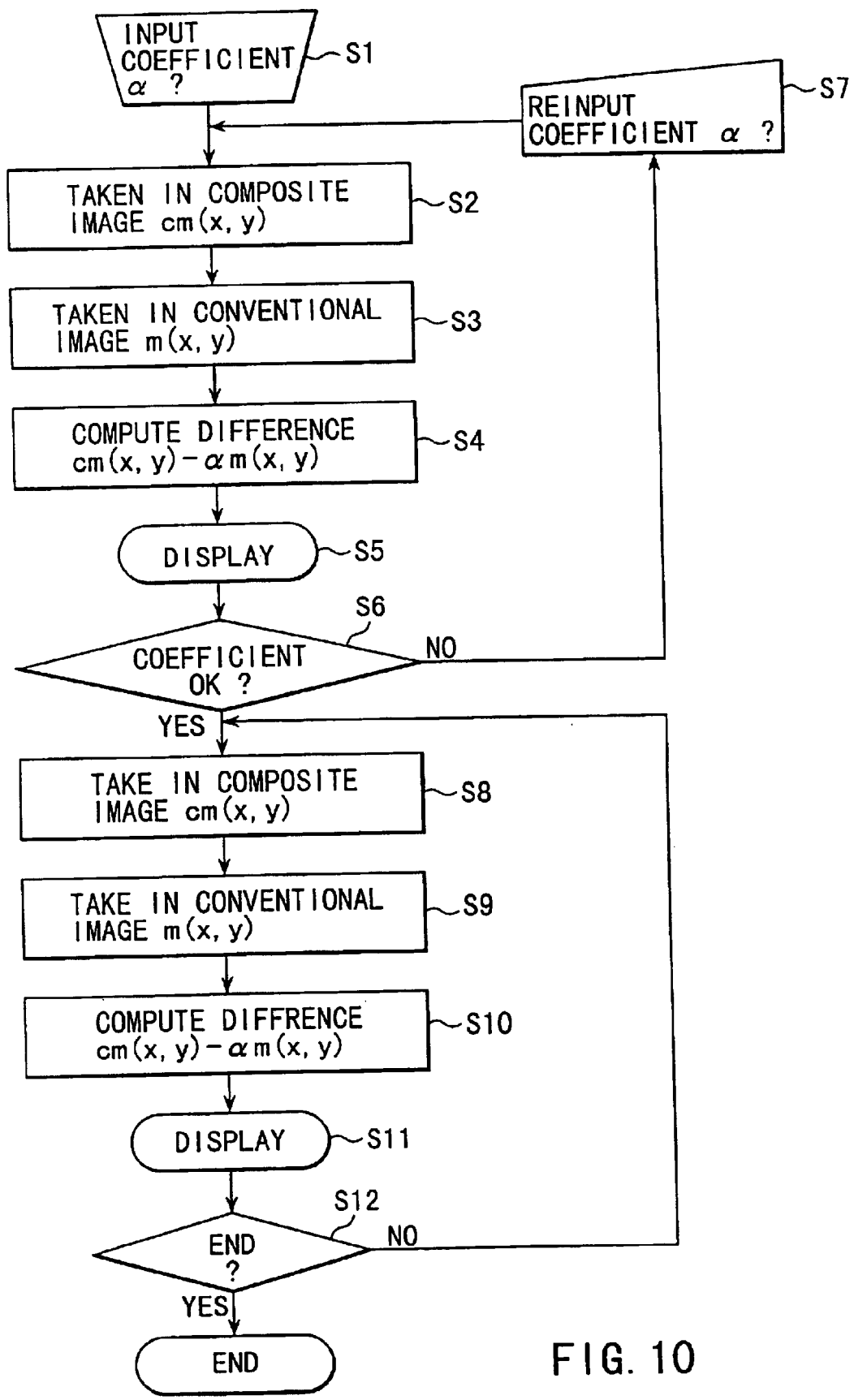
FIG. 10 is a flow chart of the measuring operation of the confocal microscope of FIG. 8.

This operation will be discussed in greater detail by referring to the flow chart of FIG. 10.

Firstly, in Step S1, coefficient α to be used for subtracting the conventional image (non-confocal image) data obtained by means of the aperture section 64*b* from the composite image data obtained by means of the linear pattern section 64*a* is input. While the coefficient α may vary depending on the transmissivity of the linear pattern section 64*a*, the ratio of the area of the linear pattern section 64*a* and the aperture section 64*b*, the magnification of the objective lens and the value of NA, it is typically between 0.5 and 1.5.

Then, in Step S2, the composite image data is taken in and, in Step S3, the conventional image data is taken in. These data are then stored in the image memory 54. Then, in Step S4, the conventional image data $m_{(x,y)}$ is multiplied by coefficient α input in Step S1 by the coefficient program 66*b* and then the CPU 52 carries out the operation of $$c_{(x,y)} = cm_{(x,y)} - \alpha m_{(x,y)} \tag{9}$$

by means of subtraction operation program 66*a* to obtain the confocal image data $c_{(x,y)}$ for the pixel position of (x,y). In this way, the above operation is repeated on each image data corresponding to each and every pixel position.

Thereafter, in Step S5, the image obtained as a result of the above operations is displayed on the display screen of the monitor 58. Subsequently, in Step S6, the displayed image is observed and evaluated by the user and the user determines if the coefficient α is appropriate. If it is found in Step S6 that the coefficient α is not appropriate, the processing operation proceeds to Step S7, where another coefficient α is entered, and then Steps S2 through S6 are followed once again. When another coefficient α is input, the original coefficient α will be replaced by a smaller value if the resolution is excessive in the Z-direction, whereas the original coefficient α will be replaced by a larger value if the resolution is too poor.

If, on the other hand, it is found in Step S6 that the coefficient α is appropriate, the processing operation proceeds to Steps S8 and S9, where the composite image and the conventional image are taken in once again and stored in the image memory 54.

Then, in Step S10, the replaced coefficient α is used and the composite image data $cm_{(x,y)}$ and the conventional image data $m_{(x,y)}$ corresponding to pixel position (x,y) are used to substitute those of formula (9) to obtain the confocal image data $c_{(x,y)}$. In this way, the above operation is repeated on each image data corresponding to each and every pixel position.

Thereafter, in Step S11, the image obtained as a result of the above operations is displayed on the display screen of the monitor 58. Subsequently, in Step S12, the displayed image is observed and evaluated by the user and the user determines if the operation should be terminated or not. If it is determined that the operation should not be terminated, Steps S8 through 12 are followed once again. If, on the other hand, it is determined that the operation should be terminated, the processing operation is terminated.

For obtaining a three-dimensional image of a part of the specimen 40 located near the surface thereof, the specimen is moved vertically by means of a vertically movable stage or a piezoelectric device so that a confocal image is produced as the obtained vertical image is modified accordingly. Then, a three-dimensional image is obtained by synthetically combining the obtained plurality of images.

Thus, according to the invention, a confocal image is obtained by means of programs adapted to make the ratio of the brightness of the composite image to that of the conventional image adjustable. Therefore an optimal confocal image can be obtained reliably and easily without replacing the rotary disk if the conditions of observation are changed as a result of replacing the objective lens or the specimen.

There may be cases where it is desirable to observe the relationship of an upper portion and a lower portion of a specimen by reducing the confocal effect and leaving the non-confocal image slightly effective in addition to the confocal image. If such is the case, the microscope can be regulated easily simply by modifying the coefficient α without replacing the rotary disk.

Now, the fourth embodiment of the invention will be described below.

The fourth embodiment of confocal microscope according to the invention has a configuration similar to the third embodiment as shown in FIG. 8. FIG. 11A is a schematic plan view of a rotary disk that can be used for the fourth embodiment of confocal microscope according to the invention.

This fourth embodiment differs from the above described third embodiment only in that the ratio of the quantity of light of the composite to that of the conventional image is varied not by means of programs by modifying the area of the light blocking sections.

Referring to FIG. 11A, the rotary disk 70 comprises a random pin hole pattern section 70b having a plurality of randomly arranged pin holes 70a, the number of which is so selected that the area of the pin holes 70a occupies 25 to 50% of the total of the section 70b, and an aperture section 70c where light can pass freely along with light blocking sections 70d, 70e arranged between the random pin hole pattern section 70b and the aperture section 70c.

As shown in FIG. 11B, each of the light blocking sections 70d and 70e has a pair of sector-shaped shield plates $70_1$ and $70_2$. The shield plates $70_1$ and $70_2$ are rotatable around a common rotary shaft not shown in FIG. 11B both in the sense indicated by arrow C and in the sense indicated by arrow D. Each of the shield plates $70_1$ and $70_2$ has a profile as shown in FIG. 12A and is provided with a through hole at the top of the sector for allowing the rotary shaft to pass therethrough.

FIG. 12B is a schematic cross sectional lateral view of the rotary disk 70 to which the shield plates $70_1$ and $70_2$ are fitted. As may be seen from FIG. 12B, each of the light blocking sections 70d, 70e is provided with a pair of shield plates $70_1$ and $70_2$, only one of the two pairs of shield plates is shown because they are identical and symmetrically arranged.

The shield plates $70_1$ and $70_2$ are fitted to the rotary disk 70 by means of the holes arranged at the top thereof and shield plate holding members 72a, 72b. The shield plates $70_1$ and $70_2$ are provided at the center thereof with a through hole for allowing the rotary shaft to pass therethrough. Additionally, the shield plate $70_1$ is provided at the outer periphery thereof with screw threads, whereas the shield plate $70_2$ is provided at the inner periphery thereof with screw threads. Thus, the shield plates $70_1$ and $70_2$ can be rigidly held in position by tightening a screw (not shown).

The area of the light blocking sections 70d, 70e can be modified by loosening the screw rigidly holding the shield plate holding members 72a, 72b and moving the shield plates $70_1$ and $70_2$ around the rotary shaft to modify the area of the aperture section 70c and that of the random pin hole pattern section 70b. Then, the shield plate holding members 72a, 72b are made to be rigidly held in position by tightening the screw so that the shield plates $70_1$ and $70_2$ may become immobile once again.

The rotary disk 70 is linked to the shaft of the motor 42 by way of the rotary shaft 42a so that it can be driven to rotate at a constant rotary speed.

The central angle of the shield plates $70_1$ and $70_2$ is preferably between 60° and 90°. While both of the shield plates $70_1$ and $70_2$ are movable in the description made above by referring to FIG. 11B, one of them may be made stationary so that only the other is movable.

The above fourth embodiment operates in a manner as described below.

Same as the above described third embodiment, the CCD camera 46 is controlled for the timing of its operation of picking up two images including one formed by the beam of light passing through the pin holes 70a of the random pin hole pattern section 70b and one formed by the beam of light passing through the aperture section 70c in synchronism with the rotary speed of the rotary disk 70.

The images output from the CCD camera 46 are converted into digital data by the A/D board 48 and stored in the image memory 54 by way of the bus 50. As described earlier, the image obtained by means of the random pin hole pattern section 70b is a composite image formed by adding a non-confocal image to a confocal image. If the image data of the composite image corresponding to pixel position (x,y) of the image pickup device of the CCD camera 46 is $cm_{(x,y)}$ and the image data corresponding to the conventional image is $m_{(x,y)}$, the image data $c_{(x,y)}$ of the confocal image for the position (x,y) can be obtained by formula (10) below.

$$c_{(x,y)} = cm_{(x,y)} - m_{(x,y)} \tag{10}$$

A confocal image can be obtained by carrying out the arithmetic operation of formula (10) above for all the pixels.

The above operation is carried out on the basis of the composite image data and the conventional image data stored in the image memory 54 as the CPU 52 executes the subtraction program 66a stored in memory 56.

Meanwhile, the ratio of the brightness of the composite image to that of the conventional image is determined by the ratio of the area of the pin hole pattern section 70b and that of the aperture section 70c. The non-confocal component of a composite image can be eliminated only by equalizing the brightness of the conventional image and that of the non-confocal component of the composite it. If they show different levels of brightness, the non-confocal image component can be left in the outcome of the subtraction or the confocal image can be subtracted and missed.

In view of the above circumstances, the user needs to shift the shield plates $70_1$ and $70_2$ of the rotary disk 70 in the sense of C or D as shown in FIG. 11B, while confirming the outcome of the subtraction on the image displayed on the display screen of the monitor 58 and observing the confocal effect (a state where the components other than the focused image component are eliminated from the image) by shifting the focal point. As a result, at least the area of the pin hole pattern section 70b or that of the aperture section 70c is modified to adjust the ratio of the two areas.

In this way, the user can easily obtain the confocal image without replacing the rotary disk because the ratio of the brightness of the composite image to that of the brightness of the conventional image can be regulated by modifying the ratio of the area of the random pin hole section to the aperture section.

There may be cases where it is desirable to observe the relationship of an upper portion and a lower portion of a specimen by reducing the confocal effect and leaving the non-confocal image slightly effective in addition to the confocal image. If such is the case, the microscope can be regulated for that purpose without replacing the rotary disk simply by modifying the ratio of the area of the random pin hole pattern section to that of the aperture section.

It is known that there are disk scanning type confocal microscopes and laser scanning type confocal microscopes. The disk scanning type confocal microscope shows not only a high horizontal resolution but also a remarkable sectioning effect in the Z-direction (direction of the height) of the specimen if compared with conventional microscopes. Thus, an excellent three-dimensional image of a specimen can be obtained by combining a confocal microscope and the advanced image processing technology.

The disk scanning type confocal microscope allows two modes of observation: visual observation and observation using an image pickup apparatus (CCD camera). Disk scanning type confocal microscopes are described, inter alia, in Japanese Patent Applications Laid-Open Nos. 9-80315 and 9-297267. The disk scanning type confocal microscopes as described in those patent documents involve the use of a Nipkow's disk and an image pickup device. More specifically, the number of revolutions per unit time of the disk and the operation of the image pickup device are controlled in a synchronized manner to prevent any uneven brightness from appearing in the obtained image. Additionally, also in the above-described method of obtaining a confocal image by using a disk having a patterned bright section where a pattern of randomly arranged pin holes is formed, an unpatterned bright section where no pattern is formed and a light blocking section and carrying out an image processing operation on the basis of the images obtained by means of the two bright sections, it is obviously essential that the operation of the image pickup device and the number of revolutions per unit time of the disk should be controlled in a synchronized manner when using such a microscope.

The disk scanning type confocal microscope can provide an image without uneven brightness when the relative distance between the objective lens and the specimen is held constant. Obviously, it is desirable to obtain an image without uneven brightness when the image is a three-dimensional image of a specimen formed by utilizing the sectioning effect of a confocal microscope.

When forming a three-dimensional image of a specimen by utilizing the sectioning effect, it is necessary to modifying the relative distance between the objective lens and the specimen stepwise, using minute steps, and obtain a confocal image without uneven brightness in each step. Additionally, such a three-dimensional image should be formed within a minimal period of time.

However, known disk scanning type confocal microscopes are technologically not provided with means for obtaining a three-dimensional image in a minimal period of time without uneven brightness. Therefore, there is a strong demand for disk scanning type confocal microscopes that can optimally exploit the sectioning effect of the microscope.

The fifth embodiment of confocal microscope according to the invention is adapted to form a three-dimensional image without uneven brightness by optimally exploiting the sectioning effect of the confocal microscope.

Figure 13:
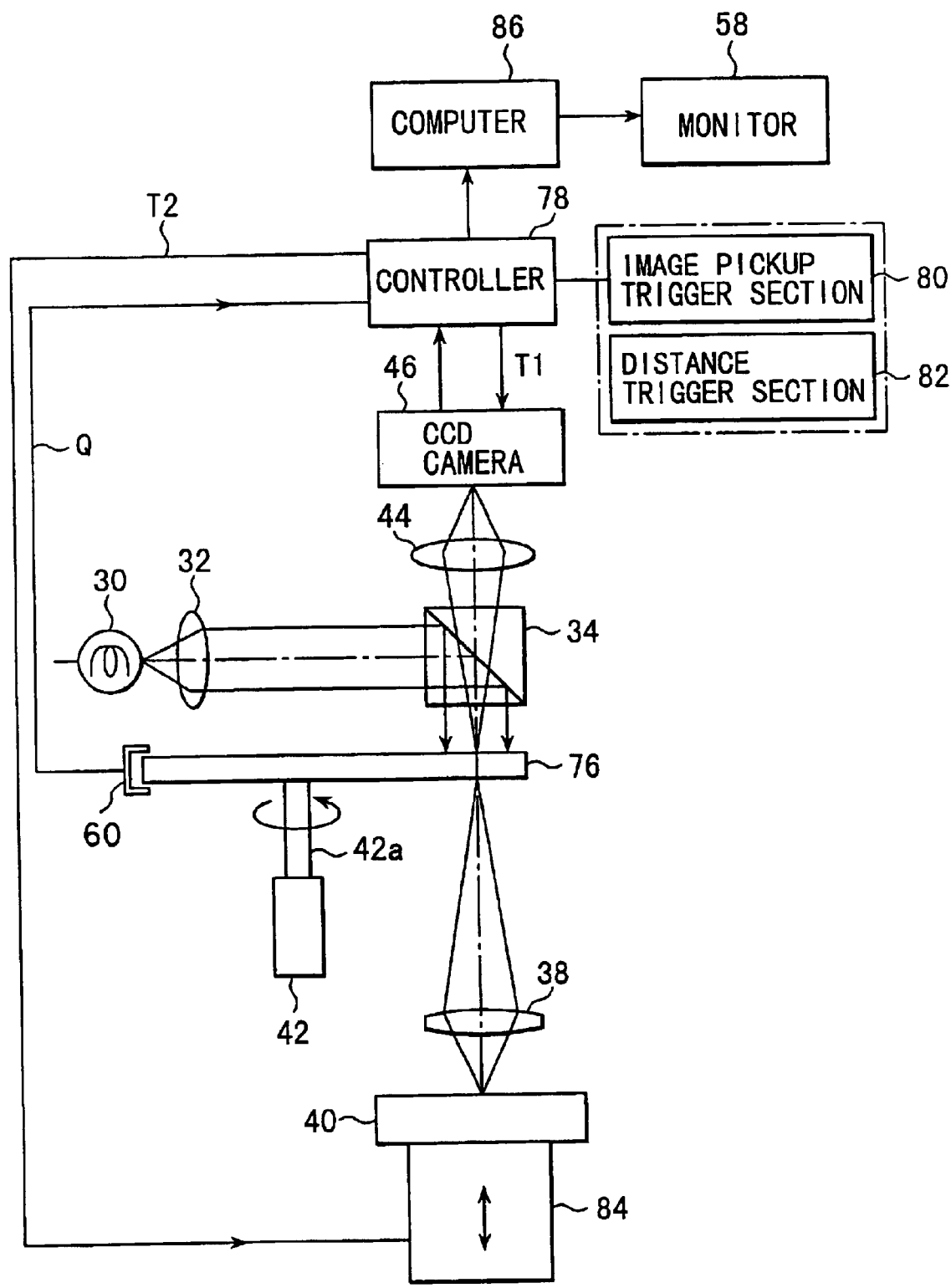
FIG. 13 is a schematic block diagram of the fifth embodiment of confocal microscope according to the invention, which is of the disk scanning type.

FIG. 13 is a schematic block diagram of the fifth embodiment of confocal microscope according to the invention, which is of the disk scanning type.

The disk scanning type confocal microscope of FIG. 13 is designed to operate its CCD camera 46 for picking up an image in synchronism with the rotary motion of its mask pattern member, which is a rotary disk 76, and is provided with a drive means for modifying the relative distance between the objective lens 38 and the specimen 40 along the optical axis of the microscope.

The rotary disk 76 may comprise a Nipkow's disk. As shown in FIG. 14, it has a pattern section (pin hole region) 76b, where a plurality of pin holes 76a are arranged, and a light blocking section 76d typically formed along the outer periphery of the pattern section by evaporating chromium, where a total of four through holes 76c are formed at regular intervals of 90°.

The rotary disk 76 is also provided along the edge thereof with a photo-interrupter 60 as revolution detection means for detecting the revolutions of the rotary disk 76. The photo-interrupter 60 is adapted to output a revolution detection signal Q including four pulses per revolution of the disk, as shown in FIG. 15A. The signal Q indicates that the rotary disk 76 is driven to rotate and the four through holes 76c formed along the edge of the rotary disk 76 cross the photo-interrupter 60.

Referring to FIG. 13, controller 78 takes in the revolution detection signal output from the photo-interrupter 60 and operates the CCD camera 46 for exposure in synchronism with the rotary motion of the rotary disk 76, while modifying the relative distance between the objective lens 38 and the specimen 40 along the optical axis of the microscope. More specifically, it is provided with an image pickup trigger section 80 and a distance trigger section 82. The image pickup trigger section 80 outputs a trigger signal T1 (see FIG. 15B) to the CCD camera in order to operate the CCD camera 46 for exposure in synchronism with the rotary motion of the rotary disk 76, or at every other pulse of the revolution detection signal Q as shown in FIG. 15A.

The distance trigger section 82, on the other hand, outputs a Z-trigger signal T2 (see FIG. 15D) to Z-stage 84 carrying the specimen 40 thereon at timing not overlapping with the timing of outputting the trigger signal T1, or with the exposure operation of the CCD camera 46, in order to modify the relative distance between the objective lens 38 and the specimen 40 along the optical axis of the microscope. More specifically, in the present instance, it is adapted to modify the relative distance between the objective lens 48 and the specimen 40 along the optical axis of the microscope by driving the Z-stage 84 stepwise by a predefined distance at a step and then stopping it.

The embodiment of confocal microscope having the above described configuration operates in a manner as described below.

The beam of light emitted from light source 30 is made to strike half mirror 34 by way of collimator lens 32 and reflected by the half mirror 34 to irradiate the rotary disk 76. the rotary disk 76 is driven to rotate at a predetermined rate by means of motor 42. The beam of light made to strike the rotary disk 76 then passes through the plurality of pin holes 76a formed in the rotary disk 76 and is focused on specimen 40 (focal position) by objective lens 38.

The beam of light reflected by the specimen 40 is transmitted through the half mirror 34 by way of the objective lens 38 and the pin holes 76a of the rotary disk 76 and made to enter CCD camera 46 by way of condenser lens 44. Thus, the CCD camera 46 picks up the beam of light reflected by the specimen 40 and the image signal produced by the CCD camera 46 is output to controller 78.

On the other hand, the photo-interrupter 60 detects the through holes 76c arranged along the edge of the revolving rotary disk 76 and outputs a revolution detection signal Q having four pulses per revolution as shown in FIG. 15A.

The image pickup trigger section 80 of the controller 78 takes in the revolution detection signal Q output by the photo-interrupter 60 and transmits a trigger signal T1 (see FIG. 15B) to the CCD camera in order to drive the CCD camera 46 for exposure at timing synchronized with one of the pulses of the revolution detection signal Q.

The exposure time of the CCD camera 46 triggered by the trigger signal T1 is selected to be equal to the shortest time required for the rotary disk 76 to uniformly scan the entire image multiplied by an integer. As a result, the exposure time of the CCD camera 46 is optimized so that the latter picks up an image without uneven brightness and the image signal output from the camera 46 is entered to computer 86 by way of controller 78. The computer 86 receives the image signal output from the CCD camera 46 and carries out a predetermined processing operation on the signal to produce and store a desired image data. At the same time, it displays the obtained image on the display screen of the monitor 58.

Now, the process of preparing a three-dimensional image of the confocal microscope by utilizing the sectioning effect in the direction of the height of the specimen will be discussed below.

As an image is obtained with an optimal exposure time of the CCD camera 46 without uneven brightness in a manner as described above, the image pickup trigger section 80 of the controller 78 transmits a trigger signal T1 as shown in FIG. 15B at timing synchronized with every other pulse of the revolution detection signal Q output from the photo-interrupter 60. At the same time, the distance trigger section 82 outputs a trigger signal T2 for triggering an operation of the Z-stage as shown in FIG. 15D to the Z-stage 84 at timing synchronized with a pulse of the revolution detection signal Q that does not overlap with the timing of outputting the trigger signal T1, or with the exposure operation of the CCD camera 46.

Thus, the Z-stage 84 is held stationary during the exposure operation of the CCD camera 46 and positionally shifted by a predefined amount only when the CCD camera 46 is not operating for exposure. AS a result of the positional shift of the Z-stage 84, the relative distance between the objective lens 38 and the specimen 40 is modified along the optical axis of the microscope.

In this way the exposure operation of the CCD camera 46 and the positional shift of the Z-stage 84 are conducted alternately and efficiently for the confocal microscope producing a three-dimensional image of the specimen 40.

As described above, with the fifth embodiment of the present invention, the rotary motion of the rotary disk 76 is detected by the photo-interrupter 60 and the CCD camera 46 is operated for exposure in synchronism with the rotary motion of the rotary disk 76, while the relative distance between the objective lens 38 and the specimen 40 is modified at timing not overlapping with the timing of exposure operation of the CCD camera 46. Thus, a three-dimensional image can be produced efficiently without uneven brightness by exploiting the sectioning effect of the confocal microscope within a minimal period of time.

Now, the sixth embodiment of confocal microscope according to the invention will be described below.

Figure 16:
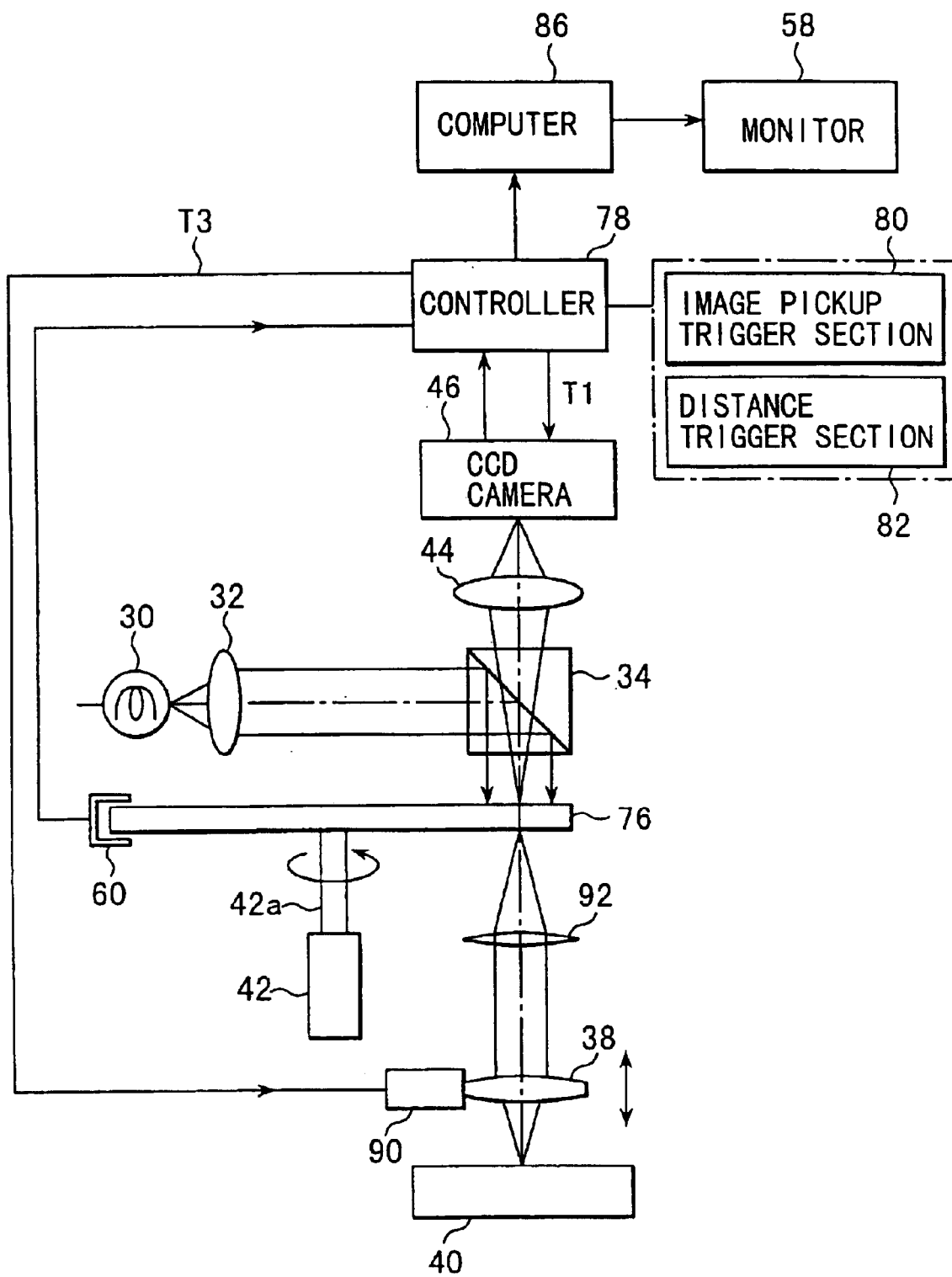
FIG. 16 is a schematic block diagram of the sixth embodiment of confocal microscope according to the invention, which is of the disk scanning type.

FIG. 16 is a schematic block diagram of the sixth embodiment of confocal microscope according to the invention, which is of the disk scanning type.

Referring to FIG. 16, objective lens 38 is movable and adapted to be driven to shift its position along the optical axis of the microscope by objective lens drive section 90. Condenser lens 92 is arranged on the optical axis between rotary disk 76 and the objective lens 38 so that the objective lens 38 may move along the optical axis.

In addition to an image pickup trigger section 80 same as that of the fifth embodiment, controller 78 also has a distance trigger section 82 for transmitting an objective lens trigger signal T3 at timing synchronized with a pulse of the revolution detection signal Q (see FIG. 15D) output from the photo-interrupter 60 but not overlapping with the timing of transmitting trigger signal T1 (see FIG. 15B), or the timing of exposure operation of CCD camera 46, in order to positionally shift the objective lens 38 by a predetermined amount and then stop it so that the relative distance between the objective lens 38 and the specimen 40 may be modified appropriately.

Now, the operation of producing a three-dimensional of the sixth embodiment by utilizing the sectioning effect along the height of the specimen 40 will be discussed below.

As in the case of the above described fifth embodiment, an image is obtained by the CCD camera 46 with an optical exposure time without uneven brightness. Then, the image pickup trigger section 80 of the controller 78 transmits a trigger signal T1 (see FIG. 15B) at timing synchronized with every other pulse of the revolution detection signal Q (see FIG. 15A) output from the photo-interrupter 60. At the same time, the distance trigger section 82 of the controller 78 transmits an objective lens trigger signal T3 at timing synchronized with a pulse of the revolution detection signal Q but not overlapping with the timing of transmitting said trigger signal T1, or the timing of the exposure operation of the CCD camera 46.

Thus, the Z-stage 84 is held stationary during the exposure operation of the CCD camera 46 and positionally shifted by a predefined amount only when the CCD camera 46 is not operating for exposure. As a result of the positional shift of the Z-stage 84, the relative distance between the objective lens 38 and the specimen 40 is modified along the optical axis of the microscope.

In this way the exposure operation of the CCD camera 46 and the positional shift of the Z-stage 84 are conducted alternately and efficiently for the confocal microscope producing a three-dimensional image of the specimen 40.

Therefore, as in the case of the fifth embodiment, the six embodiment of the invention can produce a three-dimensional image efficiently without uneven brightness by exploiting the sectioning effect of the confocal microscope within a minimal period of time.

The fifth and sixth embodiments may be modified in a manner as described below.

Figure 17:
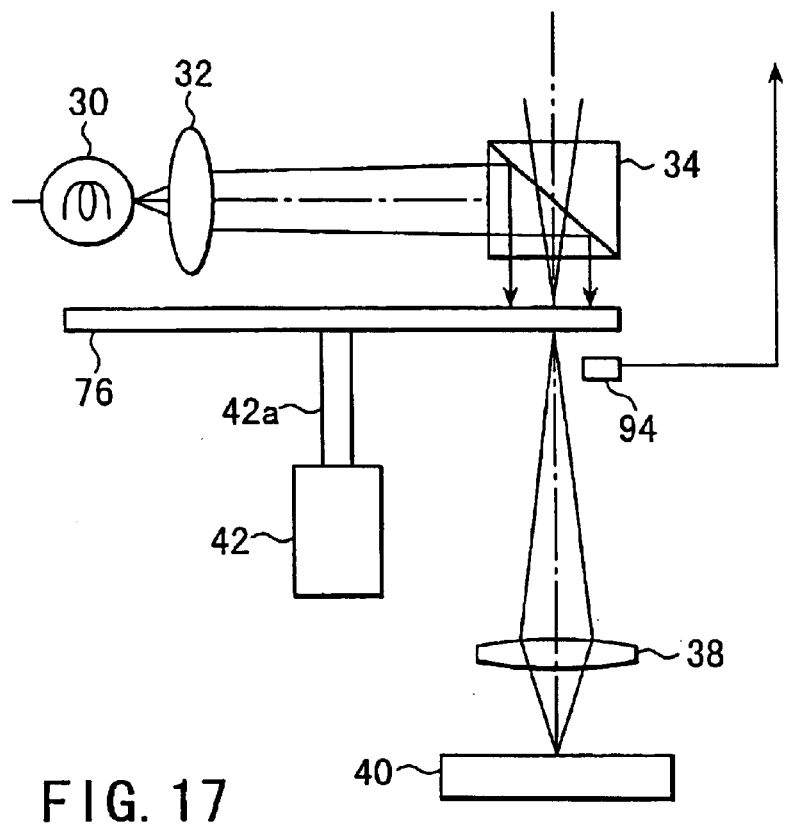
FIG. 17 is a schematic partial view of a confocal microscope obtained by modifying the sixth embodiment of confocal microscope of FIG. 16.

While a photo-interrupter 60 is used in these embodiments as mead for detecting the rotary motion of the rotary disk 76, the beam of light from the light source 30 may alternatively be used for detecting the rotary motion of the rotary disk 76 as shown in FIG. 17, which illustrates part of such a modified confocal microscope.

More specifically, a photodiode (PD) 94 is arranged below the rotary disk 76 at a position adapted to receive the beam of light passing through one of the through holes 76c arranged along the edge of the rotary disk 76. Upon detecting the beam of light passing through the through holes 76c arranged along the edge of the revolving rotary disk 76, the photodiode outputs a revolution detection signal having four pulses per revolution to the controller 78.

The revolution of the rotary disk may alternatively be detected by any appropriate means other than those described above. For example, a separate revolution detecting disk may be provided to detect the rotary motion of the motor. Then, the through holes arranged along the edge of the rotary disk are not necessary.

Additionally, the photo-interrupter 60 and photodiode 94 described above as means for detecting the rotary motion of the rotary disk 76 may be modified in various ways. Still additionally, since the pattern on the rotary disk 76 is made of a film produced by evaporation, a pattern to be used for detecting the rotary motion of the rotary disk 76 may be formed economically by using a film that can also be formed by evaporation. Thus, the above described two embodiments represent realistic solutions.

The number of through holes 76c arranged on the rotary disk 76 is not limited to four and an optimal number of through holes may be arranged depending on the pattern formed on the rotary disk 76.

Now, the seventh embodiment of the invention will be described below.

Figure 18:
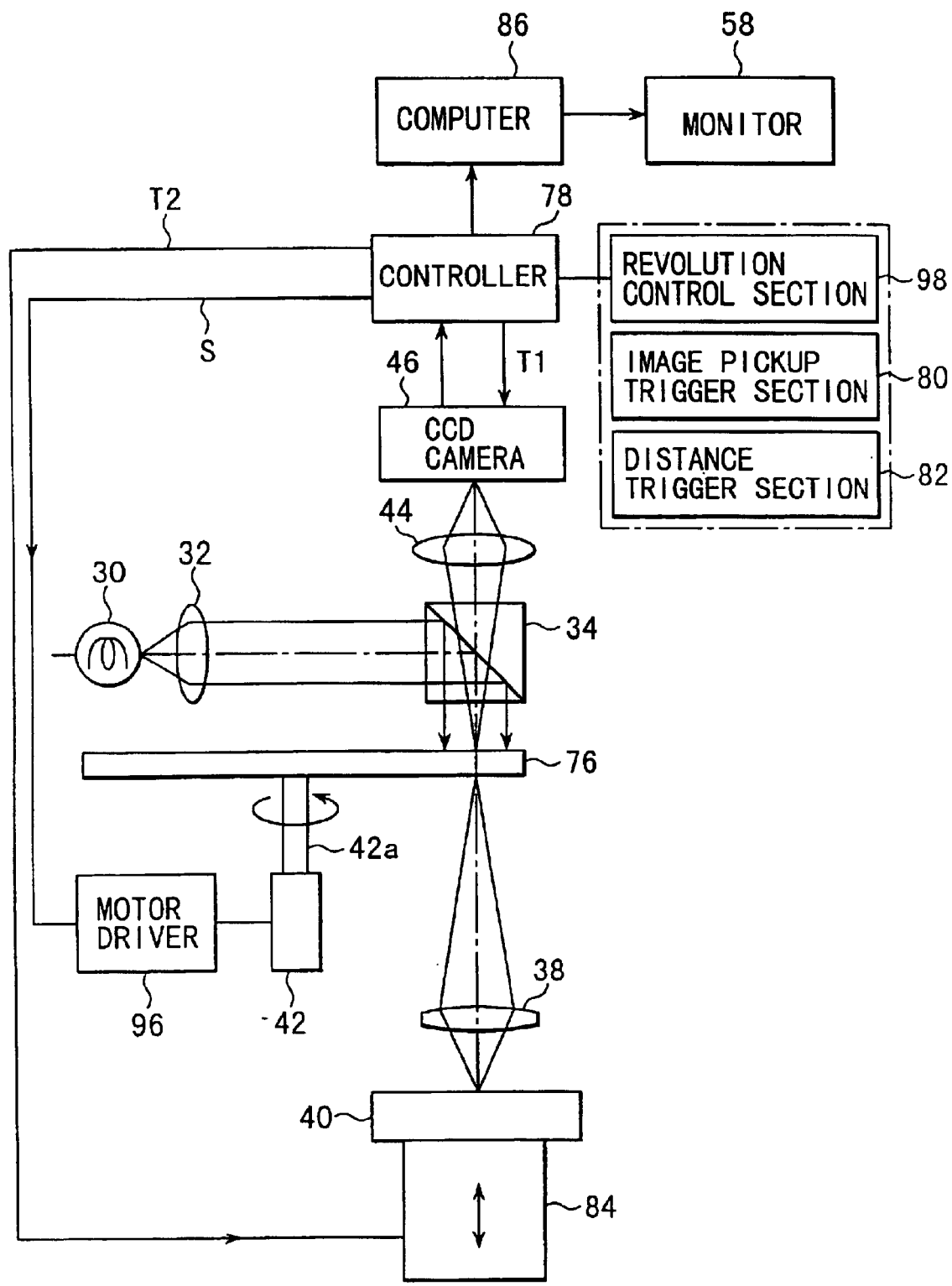
FIG. 18 is a schematic block diagram of the seventh embodiment of confocal microscope according to the invention, which is of the disk scanning type.

FIG. 18 is a schematic block diagram of the seventh embodiment of confocal microscope according to the invention, which is of the disk scanning type.

Referring to FIG. 18, motor 42 is driven by a motor driver 96 for its rotary motion.

Controller 78 receives an NTSC or PAL signal from CCD camera 46 and controls the rotary motion of rotary disk 76 on the basis of the NTSC or PAL signal. At the same time, the relative distance between objective lens 38 and specimen 40 is modified along the optical axis of the microscope. In short, the controller 78 has a rotary motion control section 98, an image pickup trigger section 80 and a distance trigger section 82, of which the rotary motion control section 98 extracts the vertical synchronizing signal from the NTSC or PAL signal of the CCD camera 46, generates a synchronizing signal S by appropriately multiplying the vertical synchronizing signal component and sends the synchronizing signal S to the motor driver 96 to control the rotary motion of the rotary disk 76.

The image pickup trigger section 80 transmits a trigger signal T1 to the CCD camera 46 on the basis of the synchronizing signal S obtained by appropriately multiplying the vertical synchronizing signal component extracted from the NTSC or PAL signal of the CCD camera 46.

The distance trigger section 82 transmits a Z-trigger signal to Z-stage 84 at timing not overlapping with the timing of the exposure operation of the CCD camera 46 on the basis of the synchronizing signal S formed from the NTSC or PAL signal of the CCD camera 46 and modifies the relative distance between the specimen 40 and the objective lens 38 along the optical axis of the microscope by driving the Z-stage 84 stepwise by a predefined distance at a step and then stopping it.

The embodiment of confocal microscope having the above described configuration operates in a manner as described below.

The beam of light emitted from light source 30 is made to strike half mirror 34 by way of collimator lens 32 and reflected by the half mirror 34 to irradiate the rotary disk 76. the rotary disk 76 is driven to rotate at a predetermined rate by means of motor 42. The beam of light made to strike the rotary disk 76 then passes through the plurality of pin holes 76a formed in the rotary disk 76 and is focused on specimen 40 (focal position) by objective lens 38.

The beam of light reflected by the specimen 40 is transmitted through the half mirror 34 by way of the objective lens 38 and the pin holes 76a of the rotary disk 76 and made to enter CCD camera 44 by way of condenser lens 44. Thus, the CCD camera 46 picks up the beam of light reflected by the specimen 40 and the image signal produced by the CCD camera 46 is output to controller 78.

Upon receiving the NTSC or PAL signal from the CCD camera 46, the rotary motion control section 98 of the controller 78 extracts the vertical synchronizing signal component from the NTSC or PAL signal, generates a synchronizing signal S by appropriately multiplying the extracted vertical synchronizing signal component and then transmits the synchronizing signal S to the motor driver 96 to control the number of revolutions per unit time of the rotary disk 76. As a result, the rotary disk 76 rotates at a rate equal to the video rate multiplied by an integer. In other words, the time in which the rotary disk 76 uniformly scans the specimen 40 is equal to the exposure time of the CCD camera 46 multiplied by an integer.

When the microscope produces a three-dimensional image by utilizing the sectioning effect along the direction of the height of the specimen 40, the image pickup trigger section 80 transmits a trigger signal T1 to the CCD camera 46 on the basis of the synchronizing signal S obtained by appropriately multiplying the vertical synchronizing signal component extracted from the NTSC or PAL signal of the CCD camera 46.

At the same time, the distance trigger section 82 transmits a Z-trigger signal T2 to the Z-stage 84 at timing not overlapping the timing of exposure operation of the CCD camera 46 on the basis of the synchronizing signal S obtained from the NTSC or PAL signal of the CCD camera 46.

Thus, the Z-stage 84 is held stationary during the exposure operation of the CCD camera 46 and positionally shifted by a predefined amount only when the CCD camera 46 is not operating for exposure. As a result of the positional shift of the Z-stage 84, the relative distance between the objective lens 38 and the specimen 40 is modified along the optical axis of the microscope.

In this way the exposure operation of the CCD camera 46 and the positional shift of the Z-stage 84 are conducted alternately and efficiently for the confocal microscope producing a three-dimensional image of the specimen 40.

As discussed above, the seventh embodiment of the invention is adapted to generate a synchronizing signal S by appropriately multiplying the vertical synchronizing signal component extracted from the NTSC or PAL signal of the CCD camera 46, control the number of revolutions per unit time of the rotary disk 76 by transmitting the synchronizing signal S to the motor driver 96 and operate the CCD camera 46 for exposure by transmitting trigger signal T1 on the basis of the synchronizing signal S, while modifying the relative distance between the objective lens 38 and the specimen 40 along the optical axis of the microscope at timing not overlapping with the timing of exposure operation of the CCD camera 46 also on the basis of the synchronizing signal S. Thus, as in the case of the fifth embodiment, a three-dimensional image can be produced efficiently without uneven brightness by exploiting the sectioning effect of the confocal microscope within a minimal period of time. Additionally, since an NTSC or PAL signal is utilized by this embodiment, the adverse effect, if any, of producing an image with uneven brightness can be minimized if the NTSC or PAL signal is disturbed.

The above described fifth through seventh embodiments of the invention may be modified appropriately in a manner as described below.

While a rotary disk 76 is used as mask pattern member in each of the fifth through seventh embodiments, the present invention is by no means limited thereto. For instance, pin holes similar to those of the rotary disk may be displayed on a liquid crystal display and made to rotate like those of the rotary disk 76 or swing within a predetermined range. Alternatively, a linear pattern may be made to rotate or swing with a range defined by 90°. Still alternatively, a cylindrical disk may be used.

In the seventh embodiment, it may be so arranged that the objective lens 38 is alternatively moved as in the case of the sixth embodiment in place of driving the Z-stage 84 to move the specimen 40. Then, it may be needless to say that a condenser lens 92 has to be arranged as shown in FIG. 16.

Additionally, while a Z-trigger signal T1 is transmitted to the Z-stage 84 in the fifth through seventh embodiments, it may alternatively be so arranged that the Z-stage 84 transmits a trigger signal to operate the CCD camera 46 for exposure.

While a half mirror is used in the above described embodiments, the present invention is by no means limited thereto and a polarizing beam splitter or a dichroic mirror may alternatively be used depending on the type of the light source.

In a confocal microscope as proposed by T. Wilson et al., the diameter of the random pin holes and the line width are fixed, and the pin hole diameter cannot be changed in accordance with the objective lens. Thus, there is a demand for a confocal microscope that allows the selective use of a desired pattern on the rotary member thereof depending on the magnification of the objective lens and is adapted to synchronize the operation of the image pickup means such as a CCD camera and the rotary motion of the rotary member in order to produce a high quality confocal image.

The eighth embodiment of confocal microscope as described hereinafter is designed to meet the demand and allows the selective use of a desired pattern depending on the magnification of the objective lens in order to produce a high quality confocal image.

Figure 19:
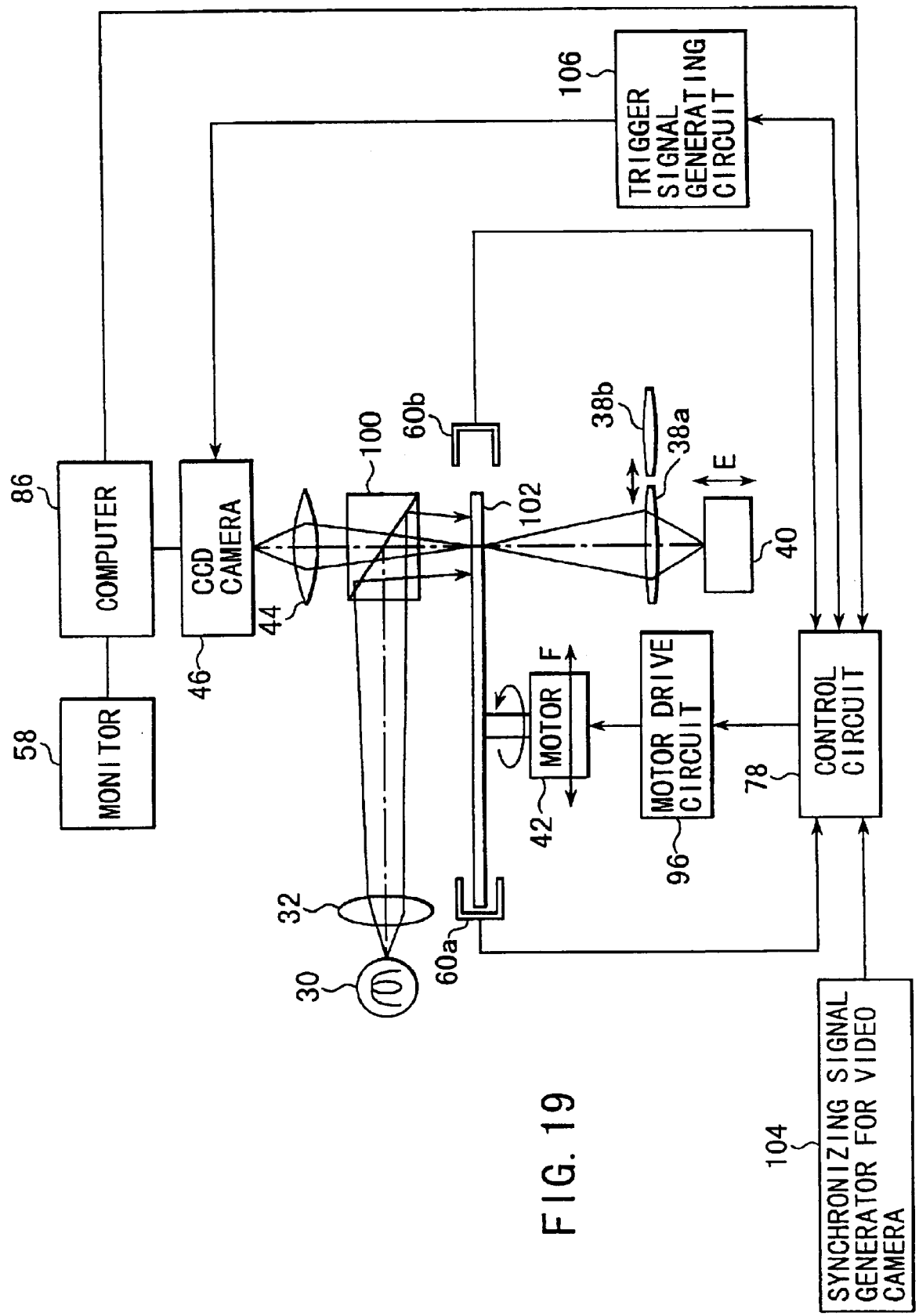
FIG. 19 is a schematic block diagram of the eighth embodiment of confocal microscope according to the invention.

FIG. 19 is a schematic block diagram of the eighth embodiment of confocal microscope according to the invention.

Referring to FIG. 19, an optical lens 32 and a beam splitter 100 are arranged on the optical path of the beam of light emitted from light source 30 that may be a halogen lamp or a mercury lamp. Then, a specimen 40 is arranged on the optical path of the beam of light reflected by the beam splitter 100 with a rotary disk 102 and an objective lens 38a or 38b interposed therebetween, said specimen 40 being movable along arrow E in FIG. 19.

The rotary disk 102 is linked to motor 42 so that it can be driven to rotate at a predetermined rotary speed. A CCD camera 46 is arranged on the optical path of beam splitter 100, on which light or fluorescent light reflected from a specimen passes, with a condenser lens 44 interposed therebetween. The image obtained by the CCD camera 46 is displayed on the display screen of monitor 58 by means of computer 86.

The CCD camera 46 is controlled for the timing of its image pickup operation in synchronism with the rotary speed of the rotary disk 102 when picking up an image by using the beam of light that may be fluorescent light reflected by specimen 40. The image output terminal of the CCD camera 46 is connected to the computer 86 that processes the picked up image in order to display it on the display screen of the monitor 58.

Photodetectors 60a and 60b are arranged near the rotary disk 102 to detect the beam of light passing through synchronism markers (which will be described in detail hereinafter) arranged on the rotary disk 102.

The motor 42 is linked directly to the rotary disk 102 and controlled for its rotary motion by a means of a signal from motor drive circuit 96.

Synchronizing signal generator 104 for video camera is adapted to generate a synchronizing signal necessary for driving the CCD camera 46. The synchronizing signal generated by the synchronizing signal generator 104 is put to control circuit 78.

The control circuit 78 is adapted to compare the phase of the signal from the synchronizing signal generator 104 for video camera and that of the signal generated by the photodetector 60a (or 60b). The signal from the control circuit 78 is input to both the motor drive circuit 96 and trigger signal generating circuit 106 in order to synchronize the rotary motion of the motor 42 and the operation of the CCD camera 46.

Upon receiving the signal from the control circuit 78, the trigger signal generating circuit 106 outputs a trigger signal to the image present invention means, which is the CCD camera 46. The CCD camera 46 has an external trigger input terminal and is adapted to start an image pickup operation when receiving a trigger signal.

Two objective lenses are provided including objective lens 38a having a small magnification and a small numerical aperture (NA) and objective lens 38b having a large magnification and a large numerical aperture (NA), which are linked to an objective lens exchange mechanism such as a revolver (not shown).

Figure 20:
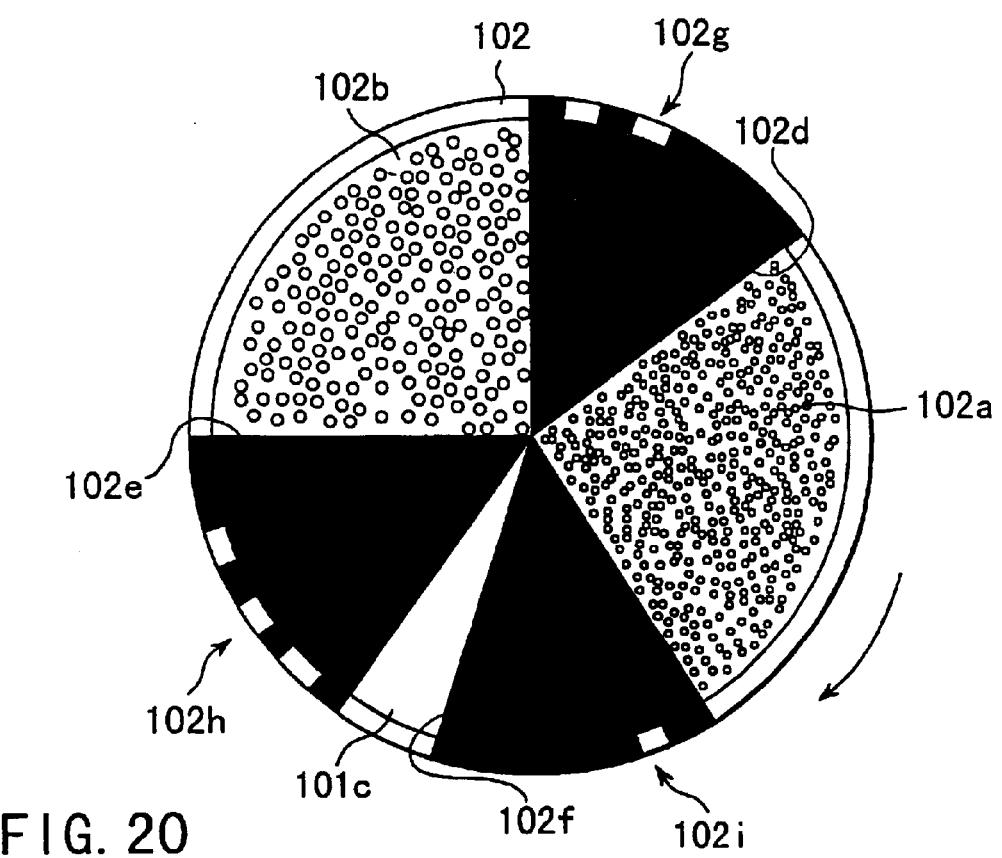
FIG. 20 is a schematic plan view of a rotary disk that can be used for the confocal microscope of FIG. 19.

As shown in FIG. 20, the rotary member, or the rotary disk 102, has a first pin hole pattern section 102a containing a large number of pin holes arranged randomly and having transmission areas which are, in total ½ the area of the pin hole pattern section 102a in a sector form, a second pin hole pattern section 102b also containing a large number of pin holes arranged randomly and having transmission areas which are, in total, ½ the area of the pin hole pattern section 102b in a sector form and an aperture section 102c for allowing light to freely pass therethrough.

The diameter of the pin holes of the pin hole pattern section 102a is adapted to the objective lens 38a having a small magnification and a small numerical aperture (NA). On the other hand, the diameter of the pin holes of the pin hole pattern section 102b is adapted to the objective lens 38b having a large magnification and a large numerical aperture (NA). It is greater than the diameter of the pin holes of the pin hole pattern section 102a.

Both the pin hole pattern section 102a and the pin hole pattern section 102b are sector-shaped with its center located at the center of the rotary disk 102 with a central angle between 90° and 135°. On the other hand, the aperture section 102c is also sector-shaped with its central angle between 22.5° and 35°. These angles are selected to provide a clear confocal image.

The pin hole pattern section 102a, the pin hole pattern section 102b and the aperture section 102c are separated from each other respectively by light blocking sections 102d, 102e, 102f arranged in a manner as shown in FIG. 20.

The rotary disk 102 is also provided along its outer periphery thereof with synchronism markers 102g, 102h, 102i. In FIG. 20, each of the synchronism markers 102g, 102h, 102i has shaded areas where light cannot pass and one or more than one white light-transmitting areas where light can pass.

Thus, the photodetectors 60a, 60b detect the light-transmitting areas of the synchronism markers 102g, 102h, 102i.

As the rotary disk 102 is driven to rotate clockwise, the single light-transmitting area of the synchronism marker 102i passes by the photodetector 60a. Then, the photodetector 60a generates a one-pulse signal and transmits it to the control circuit 78 in order to obtain an image passing through the pin hole pattern section 102a. Similarly, as the two light-transmitting areas of the synchronism marker 102g and the three light-transmitting areas of the synchronism marker 102h pass by the photodetector 60a, the latter generates two-pulse signal and three-pulse signal and transmits them to the control circuit 78 in order to obtain images passing through the pin hole pattern section 102b and the aperture section 102c respectively.

Then, a trigger signal is generated by trigger signal generating circuit 106 and input to the CCD camera 46 by way of the control circuit 78 so that only an image passing through the pin hole pattern section 102a is obtained from the 1-pulse signal generated by the photodetector 60a by referring to the synchronism marker 102i of the rotary disk 102.

Likewise, a trigger signal is generated by trigger signal generating circuit 106 and input to the CCD camera 46 by way of the control circuit 78 so that only images passing through the pin hole pattern section 102b are obtained from the 2-pulse signal generated by the photodetector 60a by referring to the synchronism marker 102g of the rotary disk 102.

In the same way, a trigger signal is generated by trigger signal generating circuit 106 and input to the CCD camera 46 by way of the control circuit 78 so that only images passing through the aperture section 102c are obtained from the 3-pulse signal generated by the photodetector 60a by referring to the synchronism marker 102h of the rotary disk 102.

Then the video signal of the images picked up by the CCD camera 46 is input to the computer 86 operating as image processing means.

The computer 86 is connected to an objective lens exchange mechanism such as a revolver (not shown). The computer 86 stores data in the control circuit 78 that are necessary for obtaining images passing through the pin hole pattern section 102a and the aperture section 102c by using the objective lens 38a having a small magnification and a small numerical aperture (NA).

As the 1-pulse signal and the 3-pulse signal generated by the photodetector 60a by using the synchronism marker 102i and the synchronism marker 102h respectively are input to the control circuit 78, the signal generated by the control circuit 78 is by turn input to the trigger signal generating circuit 106 and then the trigger signal generated by the trigger signal generating circuit 106 is sent to the CCD camera 46. Thus, the CCD camera 46 picks up only the images passing through the pin hole pattern section 102a and the aperture section 102c respectively.

On the other hand, the computer 86 stores data in the control circuit 78 that are necessary for obtaining images passing through the pin hole pattern section 102b and the aperture section 102c by using objective lens 38b having a large magnification and a large numerical aperture (NA).

Then, as the 2-pulse signal and the 3-pulse signal generated by the photodetector 60a by using the synchronism marker 102g and the synchronism marker 102h respectively are input to the control circuit 78, the signal generated by the control circuit 78 is by turn input to the trigger signal generating circuit 106 and then the trigger signal generated by the trigger signal generating circuit 106 is sent to the CCD camera 46. Thus, the CCD camera 46 picks up only the images passing through the pin hole pattern section 102c and the aperture section 102c respectively.

Thereafter, the computer 86 determines the difference between the composite image data containing a non-confocal image component as obtained after passing through the pin hole pattern section 102a (or the pin hole pattern section 102b) and the conventional image data containing only a non-confocal image component as obtained after passing the aperture section 102c. Then, the confocal image data obtained as a result of the subtraction is output to the monitor 58 and displayed on the display screen of the monitor 58.

Now, the operation of the above described embodiment of confocal microscope using a rotary disk 102 as shown in FIG. 20 will be discussed below.

The beam of light from the light source 30 is collimated and uniformized by the optical lens 32 and reflected by the beam splitter 100 before it is made to strike the rotary disk 102. The beam of light striking the rotary disk 102 then passes through the pin hole pattern section 102a or the pin hole pattern section 102b of the rotary disk 102 and the aperture section 102c and focused on the specimen 40 by the objective lens 38a (or 38b).

The beam of light reflected by the specimen 40 is focused by the objective lens 38a (or 38b) and made to pass through the pin hole pattern section 102a or the pin hole pattern section 102b and the aperture section 102c. After passing through the rotary disk 102, the beams of light from the specimen 40 are made to pass through the polarizing beam splitter 100 and focused by the condenser lens 44. Then, they are transmitted to the CCD camera 46.

On the other hand, the signal generated by the synchronizing signal generator 104 for video camera is input to the control circuit 78. The control circuit 78 then compares the phase of the signal from the synchronizing signal generator 104 for video camera and that of the signal generated by the photodetector 60a or 60b. Then, the control circuit 78 outputs an output signal to the motor drive circuit 96 and the trigger signal generating circuit 106 in order to synchronize the phase of the rotary motion of the motor 42 and that of the image pickup operation of the CCD camera 46. Thus, the motor 42 is controlled for its rotary drive operation.

When the objective lens 38a having a small magnification and a small numerical aperture (NA) is placed on the optical path, the computer 86 connected to the objective lens exchange mechanism (not shown) outputs a signal to the control circuit 78 in such a way that the image passing through the pin hole pattern section 102a and the image passing through the aperture section 102c of the rotary disk 102 may be obtained.

The control circuit 78 then forwards the trigger signal output from the trigger signal generating circuit 106 to the CCD camera 46 only when a 1-pulse signal and a 3-pulse signal are generated by the photodetector 60a by referring to the synchronism marker 102i and the synchronism marker 102h of the rotary disk 102.

Upon receiving the trigger signal, the CCD camera 46 picks up a composite image containing a non-confocal image component as obtained from the pin hole pattern section 102a and a conventional image containing only a non-confocal image component as obtained from the aperture section 102c.

Then, the computer 86 takes in the image picked up by using the pin hole pattern section 102a and the image picked up by using the aperture section 102c and produces a confocal image data obtained by determining the difference of the image data of the two images. The produced confocal image data is displayed on the display screen of the monitor 58 as the obtained confocal image.

When, on the other hand, the objective lens 38b having a large magnification and a large numerical aperture (NA) is placed on the optical path, the computer 86 connected to the objective lens exchange mechanism (not shown) outputs a signal to the control circuit 78 in such a way that the image passing through the pin hole pattern section 102b and the image passing through the aperture section 102c of the rotary disk 102 may be obtained.

The control circuit 78 then forwards the trigger signal output from the trigger signal generating circuit 106 to the CCD camera 46 only when a 2-pulse signal and a 3-pulse signal are generated by the photodetector 60a by referring to the synchronism marker 102g and the synchronism marker 102h of the rotary disk 102.

Upon receiving the trigger signal, the CCD camera 46 picks up a composite image containing a non-confocal image component as obtained from the pin hole pattern section 102b and a conventional image containing only a non-confocal image component as obtained from the aperture section 102c.

Then, the computer 86 takes in the image picked up by using the pin hole pattern section 102b and the image picked up by using the aperture section 102c and produces a confocal image data obtained by determining the difference of the image data of the two images. The produced confocal image data is displayed on the display screen of the monitor 58 as the obtained confocal image.

In FIG. 19, two photodetectors 60a, 60b are provided. However, where the rotary disk 102 is used as in the case of FIG. 20, only one photodetector (e.g. 60a) will answer the purpose. In this case, the motor 42 is not required to move in a direction indicated by the arrow, and hence may be fixed.

The motor 42 can be driven to move along arrow F in FIG. 19 by an automatic drive mechanism (not shown). Thus, since the motor 42 is movable in the direction indicated by arrow F in FIG. 19, a rotary disk 110 having a configuration as shown in FIG. 21 may also be used.

Figure 21:
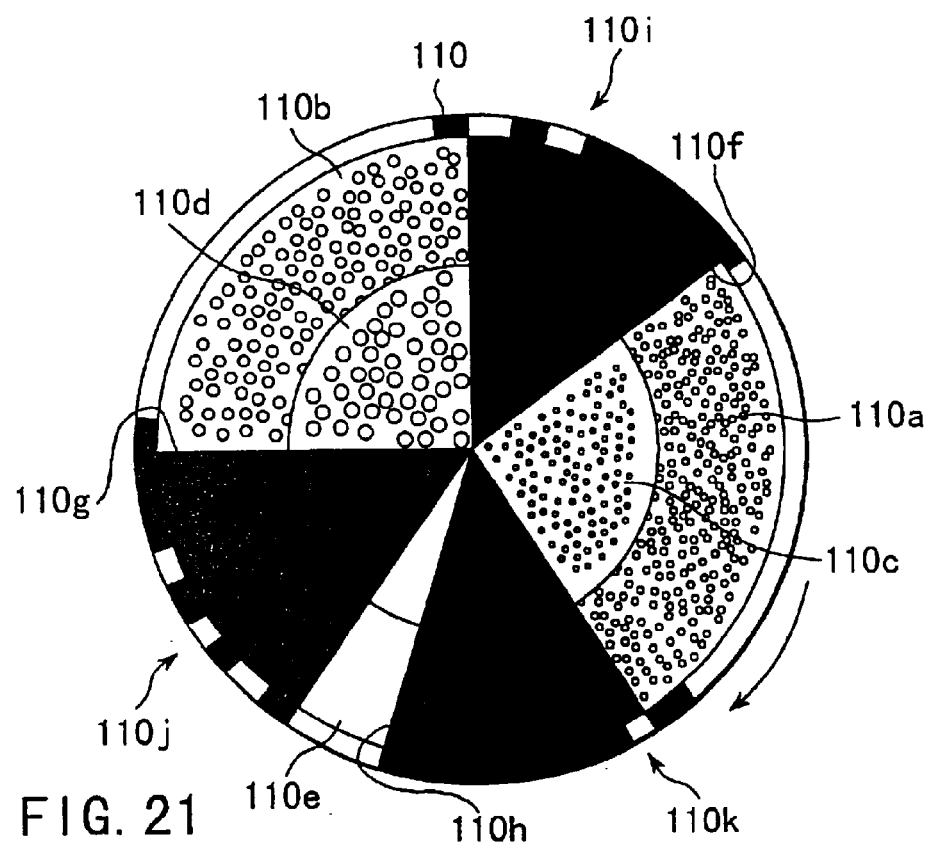
FIG. 21 is a schematic plan view of another rotary disk that can also be used for the confocal microscope of FIG. 19.

FIG. 21 is a schematic plan view of a rotary disk that can also be used for the above described eighth embodiment of the invention.

Referring to FIG. 21, pin hole pattern sections 110a, 110b containing a large number of pin holes arranged randomly are disposed along the outer periphery of the rotary disk 110. Then, pin hole pattern sections 110c, 110d are arranged inside the respective pin hole sections 110a, 110b. The pin hole pattern sections 110c, 110d also contain a large number of pin holes arranged. The pin holes of the pin hole pattern sections have respective diameters that are raised in the order of the pin hole pattern section 110c, the pin hole pattern section a, the pin hole pattern section b and pin hole pattern section d.

Additionally, an aperture section 110e that allows light to freely pass therethrough is arranged between the pin hole pattern sections 110a, 110c and the pin hole pattern sections 110b, 110d of the open drain 110.

As in the case of the rotary disk 102 of FIG. 20, the sector-shaped pin hole pattern sections 110a, 110c and the sector-shaped pin hole pattern sections 110b, 110d have a central angle between 90° and 135°. On the other hand, the sector-shaped aperture section 110e has a central angle between 22.5° and 35°.

Then, light blocking sections 110f, 110g, 110h for blocking any light trying to pass therethrough are arranged to separate the pin hole pattern sections 110a, 110c, the pin hole pattern sections 110b, 110d and the aperture section 110e from each other. Additionally, synchronism markers 110i, 110j, 110k are arranged along the outer periphery of the rotary disk 110 so that they may be detected by the photodetector 60a or 60b.

When the pin hole pattern sections 110a, 110b arranged close to the outer periphery of the rotary disk 110 and the aperture section 110e are located on the optical path of the microscope, the photodetector 60a is placed vis-à-vis the outer periphery of the rotary disk 110. On the other hand, when the pin hole pattern sections 110c, 110d arranged remote from the outer periphery and the aperture section 110e are located on the optical path of the microscope, the photodetector 60b is placed vis-à-vis the outer periphery of the rotary disk 110.

For the rotary disk 110, the operation of the computer 86 is interlocked with the objective lens exchange mechanism, which may be a revolver (not shown) and four different objective lenses (not shown) are linked to the objective lens exchange mechanism to correspond to the pin hole pattern sections 110a, 110b, 110c, 110d respectively.

This embodiment of confocal microscope additionally comprises a mechanism that makes the computer 86 store in advance at the time when a specific objective lens (not shown) is arranged on the optical of the microscope the fact that the pin hole pattern section matching the selected objective lens is located close to or remote from the outer periphery of the rotary disk 110 and automatically drives the rotary disk 110 to a position where the specific pin hole pattern section is located on the optical path.

As the 1-pulse signal generated by the photodetector 60a (or the photodetector 60b) by referring to the synchronism marker 110k of the rotary disk 110 is input to the trigger signal generating circuit 106 by way of the control circuit 78, the trigger signal generating circuit 106 outputs a trigger signal to the CCD camera 46 at timing adapted to obtain the image passing through the pin hole pattern section 110a (or the pin hole pattern section 110c).

Similarly, as the 2-pulse signal generated by the photodetector 60a (or the photodetector 60b) by referring to the synchronism marker 110i of the rotary disk 110 is input to the trigger signal generating circuit 106 by way of the control circuit 78, the trigger signal generating circuit 106 outputs a trigger signal to the CCD camera 46 at timing adapted to obtain the image passing through the pin hole pattern section 110b (or the pin hole pattern section 110d).

Additionally, the 3-pulse signal generated by the photodetector 60a (or the photodetector 60b) by referring to the synchronism marker 110j of the rotary disk 110 is input to the trigger signal generating circuit 106 by way of the control circuit 78 and then to the CCD camera 46 so that the image passing through the aperture section 110e may always be obtained.

In this way, the CCD camera 46 picks up the images passing through the pin hole pattern section 110a (the pin hole pattern section 110b, the pin hole pattern section 110c or the pin hole pattern section 110d) and the image passing through the aperture section 110e. Then, the image signal of the CCD camera 46 is sent to the computer 86 operating as image processing means.

More specifically, the computer 86 determines the difference between the composite image data containing a non-confocal image component as obtained after passing through the pin hole pattern section 110a (the pin hole pattern section 110b, the pin hole pattern section 110c or the pin hole pattern section 110d) and the conventional image data containing only a non-confocal image component as obtained after passing the aperture section 110e. Then, the confocal image data obtained as a result of the subtraction is output to the monitor 58 from the computer 86 and displayed on the display screen of the monitor 58.

Now, the operation of the above described embodiment of confocal microscope using a rotary disk 110 as shown in FIG. 21 will be discussed below.

As an objective lens is selected and placed on the optical path of the microscope, the computer 86 selects and puts the pin hole pattern section (110a, 110b, 110c or 110d) of the rotary disk 110 that matches the selected objective lens on the optical path by driving the drive mechanism (not shown). If the objective lens that matches the pin hole pattern section 110a is selected, the photodetector 60a is used for the subsequent operation.

As the synchronism marker 110k and the synchronism marker 110j of the rotary disk 110 pass by the photodetector

60*a*, the photodetector 60*a* transmits a 1-pulse signal and a 3-pulse signal to the control circuit 78. Then, the control circuit 78 outputs a signal for obtaining the image passing through the pin hole pattern section 110*a* and the image passing through the aperture section 110*e* to the trigger signal generating circuit 106.

Additionally, the trigger signal of the trigger signal generating circuit 106 is also sent to the CCD camera 46. As a result, the CCD camera 46 picks up the image passing through the pin hole pattern section 110*a* and the image passing through the aperture section 110*e* according to the trigger signal from the trigger signal generating circuit 106.

Then, the composite image data containing a non-confocal image component as obtained by way of the pin hole pattern section 110*a* and the conventional image data containing only a non-confocal image component as obtained by way of the aperture section 110*e* are sent to the computer 86, which determines the difference of the data. Then, the image representing the determined difference is sent to the monitor 58 and displayed on the display screen of the monitor 58.

If, on the other hand, the objective lens that matches the pin hole pattern section 110*d* is selected, the rotary disk 110 is driven to rotate in the sense indicated by arrow F in FIG. 21 until the inner side of the rotary disk 110 is placed on the optical path. Then, the photodetector 60*b* is used for the subsequent operation.

In a manner similar to the one used for picking up the image passing through the pin hole pattern section 110*a*, only the image passing through the pin hole pattern section 110*d* and the image passing through the aperture section 110*e* are picked up by the CCD camera 46 by referring respectively to the synchronism marker 110*i* and the synchronism marker 110*j* of the rotary disk 110.

Then, the composite image data containing a non-confocal image component as obtained by way of the pin hole pattern section 110*d* and the conventional image data containing only a non-confocal image component as obtained by way of the aperture section 110*e* are sent to the computer 86, which determines the difference of the data. Then, the image representing the determined difference is sent to the monitor 58 and displayed on the display screen of the monitor 58.

A three-dimensional image of a part of the specimen 40 located close to the surface thereof is obtained by the computer 86 that synthetically combines a plurality of images obtained along the direction of the height by moving a piezoelectric device fitted to a horizontal translation stage that carries the specimen 40 thereon in the direction as indicated by arrow E in FIG. 19.

Alternatively, a rotary disk 110 where pin holes are arranged randomly. Still alternatively, a rotary disk 112 as shown in FIG. 22 may be used.

Figure 22:
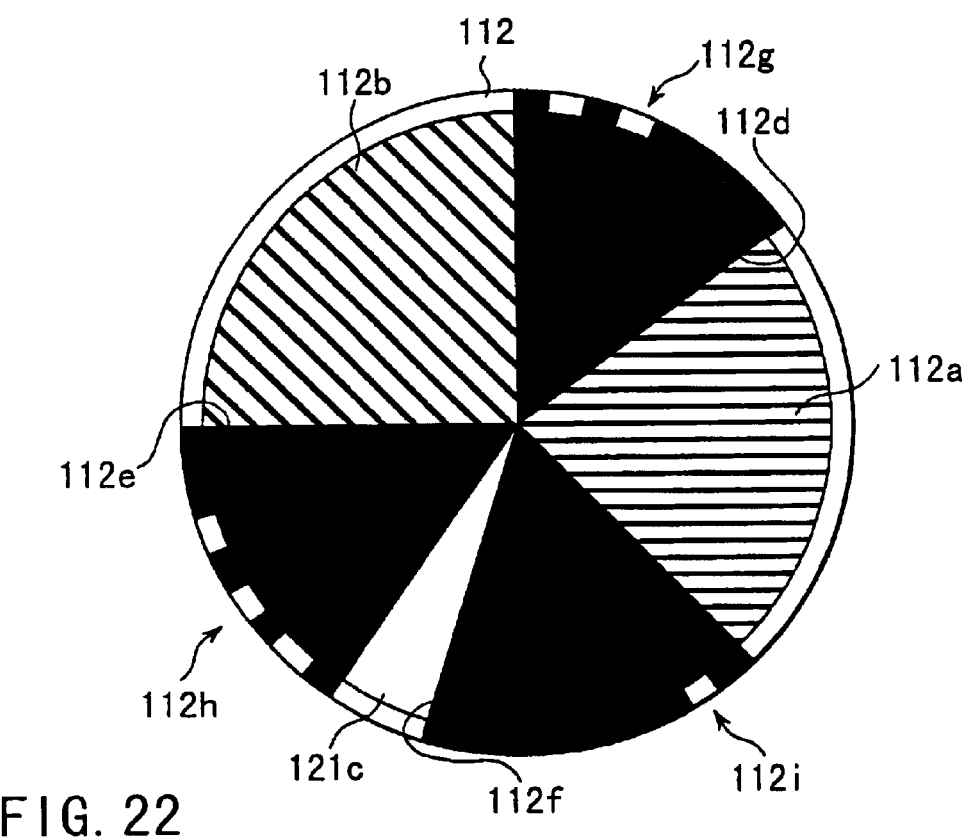
FIG. 22 is a schematic plan view of still another rotary disk that can also be used for the confocal microscope of FIG. 19.

Referring to FIG. 22, the rotary disk 112 has a linear pattern section 112*a* where lines (slits) are arranged at regular intervals, a linear pattern section 112*b* containing lines (slits) having a width different from the lines (slits) of the linear pattern section 112*a*, an aperture section 112*c* where light can pass freely and light blocking sections 112*d*, 112*e*, 112*f* separating the linear pattern sections 112*a*, 112*b* and the aperture section 112*c*. Additionally, the rotary disk 112 is provided with synchronism markers 112*g*, 112*h*, 112*i* arranged along the outer periphery thereof.

The above description on the configuration and the operation of the eighth embodiment is also applicable when rotary disk 112 as illustrated in FIG. 22 is used with it.

Note that the positions of the synchronism markers of any of the rotary disks 102, 110, 112 illustrated respectively in FIGS. 20, 21 and 22 are not limited to those as shown and described above and may be shifted appropriately so long as they can be used effectively for synchronizing the timing of image pickup operation and hence an appropriate image can be obtained by using them.

As a result of the above described configuration and operation, it is possible to always use a pin hole pattern or a line pattern that optimally matches the magnification of the selected objective lens to optimally exploit the sectioning effect of the microscope and obtain a high quality confocal image.

Additionally, since the operation of the rotary disk 102, 110, 112 and that of producing video signal of the CCD camera 46 are synchronized in any of the above embodiments, the rotary disk is made free from fluctuations in the rotary motion thereof attributable to eccentricity of the disk and/or fluctuations in the friction of the motor shaft so that it is possible to obtain a high quality confocal image.

The present invention is by no means limited to the above described embodiments. For instance, while the linear pattern sections of the second embodiment have a central angle of 90°, the central angle may be different from 90°. If such is the case, while the confocal component may vary depending on the direction, the obtained image will not show a confocal effect that varies remarkably depending on the direction if the selected central angle is greater than 90° because the confocal component is equalized in various directions in a region where the central angle is equal to 90°.

Additionally, the present invention is by no means limited to the use of a rotary disk. For instance, the rotary disk of a confocal microscope according to the invention may be replaced by a cylindrical rotary member having one or more than one random pin hole pattern sections and an aperture section or a liquid crystal display adapted to display one or more than one random pin hole pattern sections and an aperture section.

Still additionally, while pin holes are used in the third embodiment and linear slits are used in the fourth embodiment, alternatively linear slits may be used in the third embodiment and pin holes may be used in the fourth embodiment.

Furthermore, the above embodiments may be modified or combined in various different ways without departing from the scope of the invention.

As described above in detail, according to the invention, the composite image of a confocal image and a non-confocal image picked up by the image pickup means and the non-confocal image obtained by the aperture section are made to show a same level of brightness so as to produce an optimal confocal image by making the area of the aperture section $k^2$ times as large as the semi-transmissive area showing a transmissivity of k.

Additionally, a relatively uniform confocal image can be obtained by using a rotary disk having one or more than one sector-shaped semi-transmissive sections where linear openings (slits) and light blocking areas are arranged alternately if the central angle of the sector-shaped sections is made equal to or greater than 90°.

Still additionally, the ration of the brightness of the composite image containing a confocal image component and a non-confocal image component to that of the conventional image can be regulated with ease to produce an appropriate confocal image by using one or more than one coefficients and one or more than one arithmetic operations including multiplication in order to make the ratio variable Furthermore, according to the invention, the sectioning effect of a confocal microscope can be maximally exploited to produce a three-dimensional image of a specimen economically and efficiently in a minimal period of time.

A confocal microscope according to the invention can minimize the influence of disturbances that may appear on the NTSC or PAL signal and can adversely affect the obtained image.

In a confocal microscope according to the invention, the rotary motion of the rotary member and the timing of operation of the image pickup means can be synchronized and an optical pattern can be selectively used so that a high quality confocal image can be obtained by maximally exploiting the sectioning effect of the microscope according to the magnification of the objective lens.

Finally, since a plurality of pin hole patterns can be arranged on a single rotary member, a variety of objective lenses ranging from low magnification to high magnification may be selectively used in a confocal microscope according to the invention so that a high quality confocal image can be obtained by maximally exploiting the sectioning effect of the microscope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A confocal microscope adapted to focus a beam of light by way of a mask pattern member variably operating with a predetermined pattern and an objective lens, and to cause the beam of light reflected by a specimen to enter an image pickup means by way of said objective lens and said mask pattern member to produce an image of said specimen for observation, said microscope comprising:

revolution detection means for detecting a rotary motion of a disk which forms said mask pattern member;

input pickup tripper means for outputting a trigger signal to said image pickup means in synchronism with said rotary motion of said disk as detected by said revolution detection means; and distance trigger means for modifying a relative distance between said objective lens and said specimen along an optical axis of the objective lens in synchronism with said rotary motion of said disk as detected by said revolution detection means.

2. The confocal microscope according to claim 1, further comprising a Z-stage for carrying said specimen thereon and modifying the relative distance between said objective lens and said specimen along the optical axis.

3. The confocal microscope according to claim 1, further comprising an objective lens drive means for driving said objective lens along the optical axis of said objective lens and said specimen.

4. A confocal microscope adapted to focus a beam of light by way of a mask pattern member variably operating with a predetermined pattern and an objective lens, and to cause the beam of light reflected by the specimen to enter an image pickup means by way of said objective lens and said mask pattern member to produce an image of said specimen for observation, said microscope comprising:

rotary motion control means for controlling a rotary motion of a which forms said mask pattern member according to an NTSC or PAL signal from said image pickup means; and distance trigger means for modifying a distance between said objective lens and said specimen along an optical axis of said objective lens according to the NTSC or PAL signal from said image pickup means.

5. The confocal microscope according to claim 4, further comprising a Z-stage for carrying said specimen thereon and modifying the relative distance between said objective lens and said specimen along the optical axis.

6. The confocal microscope according to claim 4, further comprising an objective lens drive means for driving said objective lens along the optical axis of said objective lens and said specimen.

* * * * *